United States Patent [19]
Ben-Michael et al.

[11] Patent Number: 6,002,675
[45] Date of Patent: Dec. 14, 1999

[54] METHOD AND APPARATUS FOR CONTROLLING TRANSMISSION OF DATA OVER A NETWORK

[75] Inventors: Simoni Ben-Michael, Givat Zeev; Shuki Perlman, Tzur Hadassa; Avraham Menachem, Jerusalem, all of Israel

[73] Assignee: Cabletron Systems, Inc., Rochester, N.H.

[21] Appl. No.: 08/779,877

[22] Filed: Jan. 6, 1997

[51] Int. Cl.[6] .................................................. H04J 3/26
[52] U.S. Cl. ........................ 370/315; 395/726; 395/728; 370/389; 370/390; 370/445; 370/447
[58] Field of Search ................................ 395/726, 200.83, 395/827, 375.01, 501; 370/85.11, 60.1, 501, 315, 389, 390, 445, 447; 340/825

[56] References Cited

U.S. PATENT DOCUMENTS

| | | | |
|---|---|---|---|
| 4,597,078 | 6/1986 | Kempf | 370/94 |
| 4,797,881 | 1/1989 | Ben-Artzi | 370/88 |
| 4,910,507 | 3/1990 | Shimizu et al. | 340/825 |
| 4,945,532 | 7/1990 | Hald | 370/13 |
| 5,271,000 | 12/1993 | Engbersen et al. | |
| 5,319,644 | 6/1964 | Liang . | |
| 5,394,402 | 2/1995 | Ross | 370/94 |
| 5,430,726 | 7/1995 | Moorwood et al. | 370/85.11 |
| 5,436,617 | 7/1995 | Adams et al. | 340/825.4 |
| 5,446,735 | 8/1995 | Tobagi et al. | 370/85.3 |
| 5,455,828 | 10/1995 | Zisapel | 370/85.3 |
| 5,483,526 | 9/1996 | Ben-Michael et al. . | |
| 5,528,605 | 6/1996 | Ywoskus et al. . | |
| 5,546,385 | 8/1996 | Caspi et al. | 370/58.2 |
| 5,559,801 | 9/1996 | Lo . | |
| 5,561,669 | 10/1996 | Lenney et al. | 370/60.1 |
| 5,592,486 | 1/1997 | Lo et al. . | |
| 5,594,702 | 1/1997 | Wakeman et al. | 365/230 |
| 5,598,406 | 1/1997 | Albrecht et al. | 370/296 |
| 5,629,685 | 5/1997 | Allen et al. | 340/825 |
| 5,631,905 | 5/1997 | Yano | 370/462 |
| 5,648,959 | 7/1997 | Hyadis et al. | 370/445 |
| 5,666,488 | 9/1997 | Joh | 395/200.83 |
| 5,673,254 | 9/1997 | Crayford | 370/231 |
| 5,682,383 | 10/1997 | Dahod et al. | 370/364 |
| 5,696,763 | 12/1997 | Gang, Jr. | 370/390 |
| 5,703,883 | 12/1997 | Chen | 370/501 |
| 5,724,515 | 3/1998 | Barnes et al. | 395/200 |
| 5,726,976 | 3/1998 | Thompson et al. | 370/229 |
| 5,734,675 | 3/1998 | Leonowich | 375/211 |
| 5,737,635 | 4/1998 | Daines et al. | 395/827 |
| 5,740,174 | 4/1998 | Somer | 370/402 |
| 5,742,602 | 4/1998 | Bennett | 370/401 |
| 5,796,738 | 8/1998 | Scott et al. | 370/401 |

FOREIGN PATENT DOCUMENTS

| | | |
|---|---|---|
| 0709988 | 5/1996 | European Pat. Off. . |
| WO 9641455 | 12/1996 | European Pat. Off. . |
| 0772323 | 5/1997 | European Pat. Off. . |

*Primary Examiner*—Ayaz R. Sheikh
*Assistant Examiner*—Eric S. Thlang
*Attorney, Agent, or Firm*—Wolf, Greenfield & Sacks, P.C.

[57] ABSTRACT

A repeater which introduces a minimum of delay in the transfer of a data packet from a source LAN to a destination LAN has an arbiter which grants access to a bus for a port to broadcast a received data packet onto the bus for loading the data packet into a transmit buffer for each outgoing port. The arbiter grants access only after all ports signal that their transmit buffers are ready to load the data packet from the bus. A transmit buffer signals that it is ready to be loaded at the passage of the collision window as it is transmitting a packet previously loaded into the transmit buffer. Accordingly, the transmit buffer is simultaneously transmitting the previously loaded packet and loading the new packet after the arbiter responds to the signal.

6 Claims, 24 Drawing Sheets

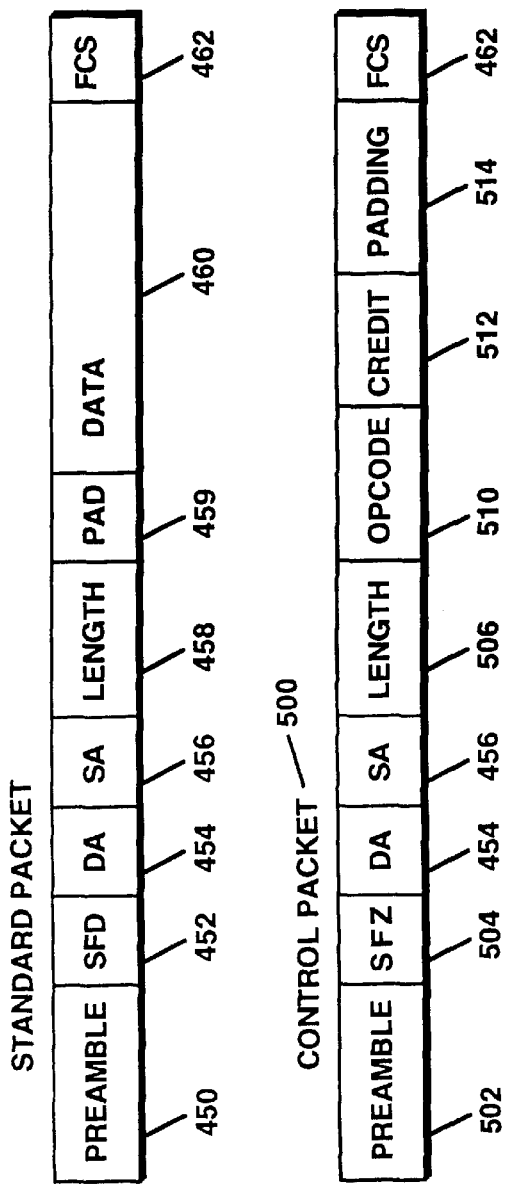

Figure 7E

720 — THIRD ALTERNATIVE EMBODIMENT OF THE INVENTION
— — — — — NONSTANDARD PREAMBLE — — — — — — | SFD BYTE /722

775 — FOURTH ALTERNATIVE EMBODIMENT OF THE INVENTION
— — — — — NONSTANDARD PREAMBLE — — — — — — | SFZ BYTE /778

780 — FIFTH ALTERNATIVE EMBODIMENT OF THE INVENTION
— — — — — NONSTANDARD PREAMBLE — — — — — — | SFZ BYTE 10101010  10101010  10101010  10101010  10101010  10101010  10101000
                                          \782                \784

METHOD AND APPARATUS FOR CONTROLLING TRANSMISSION OF DATA OVER A NETWORK

RELATED APPLICATIONS

This U.S. patent application is related to the following U.S. patent applications filed on even date with this application:

PD96-0183, "Automatic Detection of a Similar Device at the Other End of a Wire in a Computer Network", by Simoni Ben-Michael and Shuki Perlman Ser. No. 08/779,897;

PD25618, "Buffered Repeater with Independent Ethernet Collision Domains" by Simoni-Ben Michael, Shuki Perlman, and Avraham Menachem, Ser. No. 08/779,880;

PD25619, "Ethernet Network with Credit Based Flow Control", by Simoni-Ben Michael, Shuki Perlman, Efraim Kugman, Ser. No. 08/779,883;

PD25620, "Management of a Computer Network Switched Repeater", by Simoni-Ben Michael, Shuki Perlman, Michael Ben-Nun, and Yifat Ben-Shachar, Ser. No. 08/779,884, pending;

PD25621, "Adaptive Address Filtering", by Avraham Menachem and Shuki Perlman, Ser. No. 08/779,877, pending.

FIELD OF THE INVENTION

This invention relates to operation of a repeater connected to Ethernet collision domains, and more particularly to reducing delays in packet transmission through the repeater.

BACKGROUND OF THE INVENTION

Generally, a repeater receives a data packet from a first local area network (LAN) and repeats the packet onto one or more receiving LANs. Repeaters are often used with Ethernet local area networks. Each section of the Ethernet system is referred to herein as a LAN. In any case, a repeater introduces delay in the transfer of a data packet from a source LAN to a destination LAN.

When there are a plurality of local area networks connected to each other through a repeater, then the delay introduced by the repeater in transfer of a data packet between a source LAN to a destination LAN also interferes with the transfer of a different packet from a different source LAN to a different destination LAN. That is, the repeater can do only one transfer at a time, and while it is busy with a first transfer, all other LANs must wait their turn to use the repeater.

It is desirable to have a repeater which introduces as little delay as possible in the transfer of a data packet from an source LAN to a destination LAN.

SUMMARY OF THE INVENTION

A repeater which introduces a minimum of delay in the transfer of a data packet from a source LAN to a destination LAN has an arbiter which grants access to a bus for a port to broadcast a received data packet onto the bus for loading the data packet into a transmit buffer for each outgoing port. The arbiter grants access only after all ports signal that their transmit buffers are ready to load the data packet from the bus. A transmit buffer signals that it is ready to be loaded at the passage of the collision window as it is transmitting a packet previously loaded into the transmit buffer. Accordingly, the transmit buffer is simultaneously transmitting the previously loaded packet and loading the new packet after the arbiter responds to the signal.

A repeater has: a plurality of ports; a receive buffer for each port of the plurality of ports, the receive buffer to hold a packet received from an Ethernet collision domain connected to the port; a transmit buffer for each port of the plurality of ports, the transmit buffer to hold a packet to be transmitted onto the Ethernet collision domain connected to the port; and, a bus within the repeater for communication between ports of the plurality of ports, a receive buffer of a port broadcasting a packet onto the bus for loading by transmit buffers of other ports. An arbiter controls access to the bus by a port, the arbiter granting access to the bus by a requesting port, the requesting port having a recently received packet in a receive buffer of the requesting port, the arbiter granting access to the bus upon assertion of a "transmit buffer ready" signal from each port of the plurality of ports other than the requesting port. The repeater has a means for a transmitting port of the plurality of ports to assert a "transmit buffer ready" signal to the arbiter at a transmit time after passage of a collision window as the transmitting port empties its transmit buffer by transmitting a stored packet onto an Ethernet collision domain connected to the transmitting port, and at a transmit time before the transmit buffer is emptied. The repeater also has a means for the transmitting port transmit buffer to begin receiving a new packet from a receive buffer of the requesting port by the requesting port being granted access to the bus by the arbiter, and the requesting port broadcasting the new packet from its receive buffer onto the bus, the transmitting port transmit buffer loading the new packet before the transmitting port transmit buffer is emptied by transmission of the stored packet onto the Ethernet collision domain connected to the transmitting port.

BRIEF DESCRIPTION OF THE DRAWINGS

FIG. 4 is a field diagram of an Ethernet packet.

FIG. 5 is a field diagram of a control packet of the invention.

FIG. 6 is a Table.

FIG. 7B–FIG. 7G are introductory bit sequences for a control packet.

DETAILED DESCRIPTION

General Network Connections

Figure 1:
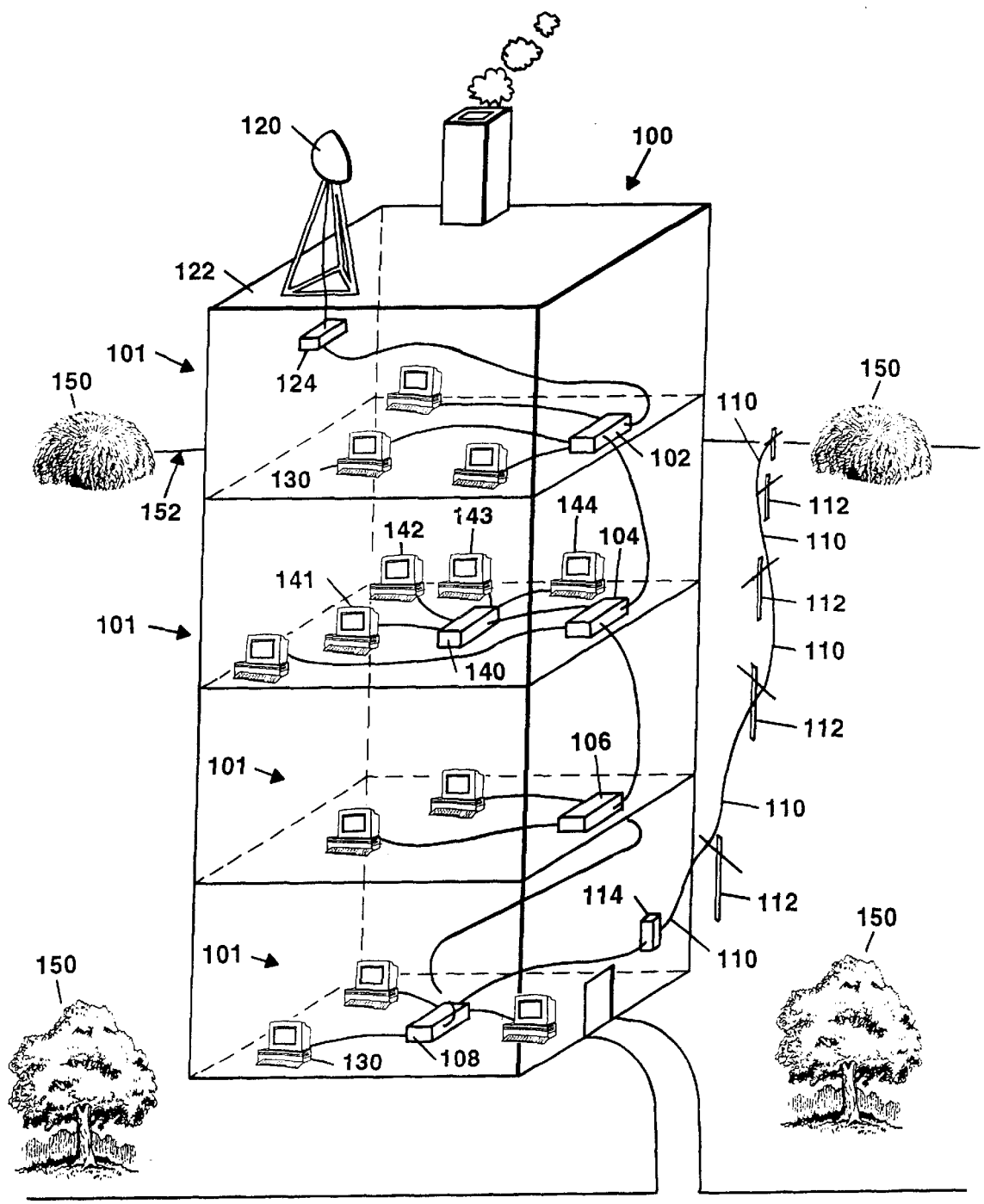
FIG. 1 is a sketch of a building having a computer network using hubs installed therein.

Turning now to FIG. 1 there is shown a building 100 having a computer network 101 installed therein. The building 100 is shown in a three dimensional transparent representation, with network components visible through transparent walls, with landscaping 150, and with horizon line 152 to better illustrate the invention. An outline of the building 100 is shown, and internal floors are shown in the transparent representation. The network is interconnected by hubs 102, 104, 106, 108. A hub is made up of one or more Semiconductor Buffered Repeater chips (BREP chips) each having a buffered repeater architecture, and interconnected by a switch engine, as described more fully hereinbelow. A hub can support several local area networks, LAN. And each LAN is a separate Ethernet collision domain. Traffic is switched between LANs by the hub.

A wide area network connection, for example, enters the building as a cable 110, illustrated as a cable 110 strung on poles 112. Cable 110 attaches to router 114. Cable 110 can be, for example, a bundle of several optical fibers, can be coaxial cables, can be telephone wires, or any convenient physical media for wide area network connection. Router 114 connects to a port of hub 108.

A second wide area network connection enters the building through an antenna 120 located on the roof 122 of building 100. Antenna 120 connects to router 124. Antenna 120 can be in communication with a satellite, can be a link in a microwave transmission path, can be a link in an infra red network, or can be any other convenient physical implementation of a communications path. Router 124 connects to a port of hub 102.

The building computer network 101 includes routers 114, 124, hubs 102, 104, 106, 108, the numerous work stations 130 connected to the hubs, and the workstations 141, 142, 143 connected to repeater 140. Through the routers, the building network is connected to wide area networks through, for example, antenna 120 and cable 110. Additionally, for example, building network 101 may include bridges, ATM switches, and so forth. And the network includes the cables connecting each of these components.

Repeater 140 is shown connected to a port of hub 104. Workstations 141, 142, 143, 144 are shown connected to ports of repeater 140. Repeater 140, the corresponding port of hub 104, and the workstations 141, 142, 143, 144 connected thereto form a single collision domain under the CSMA/CD standard.

Figure 2:
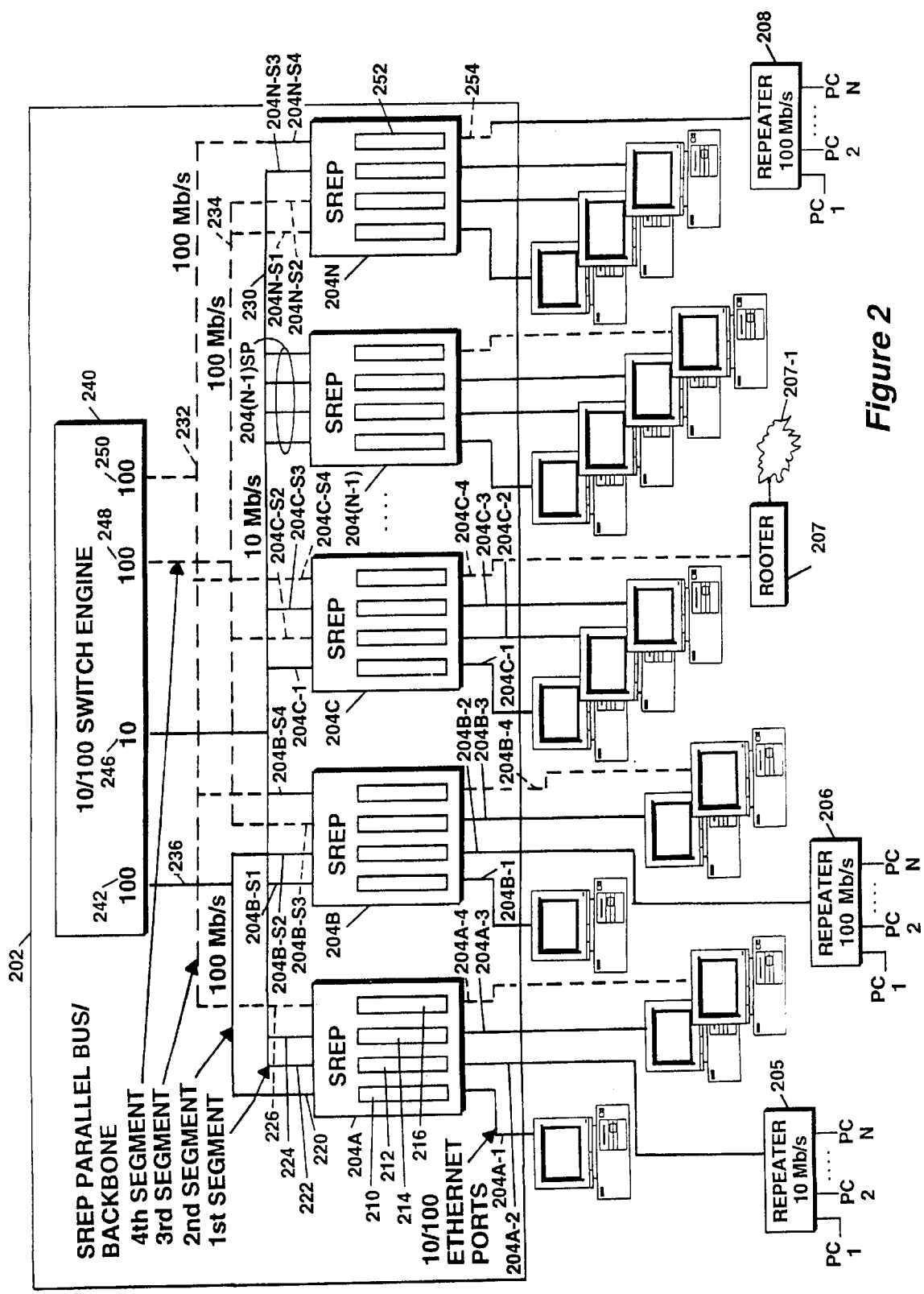
FIG. 2 is a block diagram of a hub.
Figure 3A:
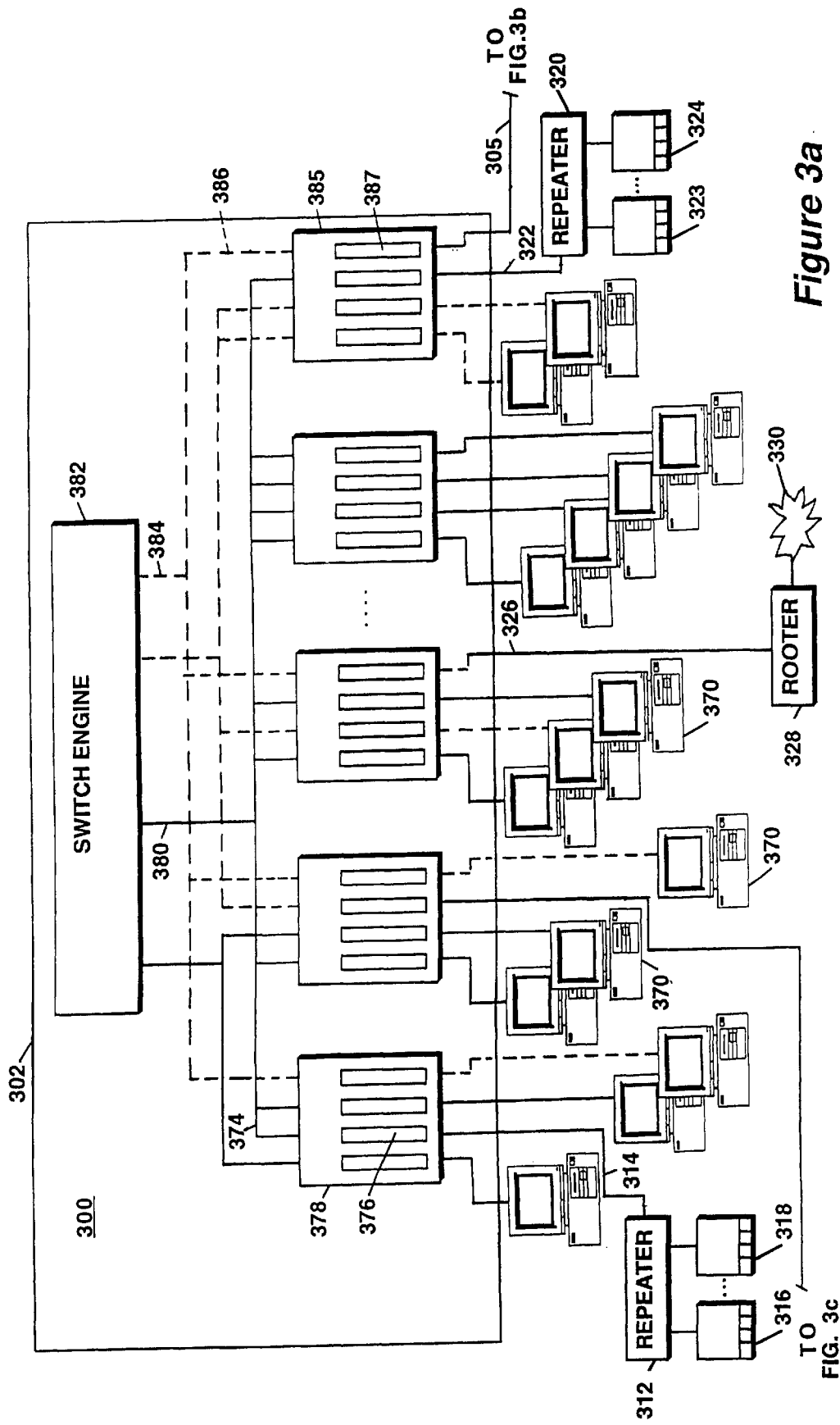
FIG. 3 is a the block diagram of a computer network using hubs.
Figure 3B:
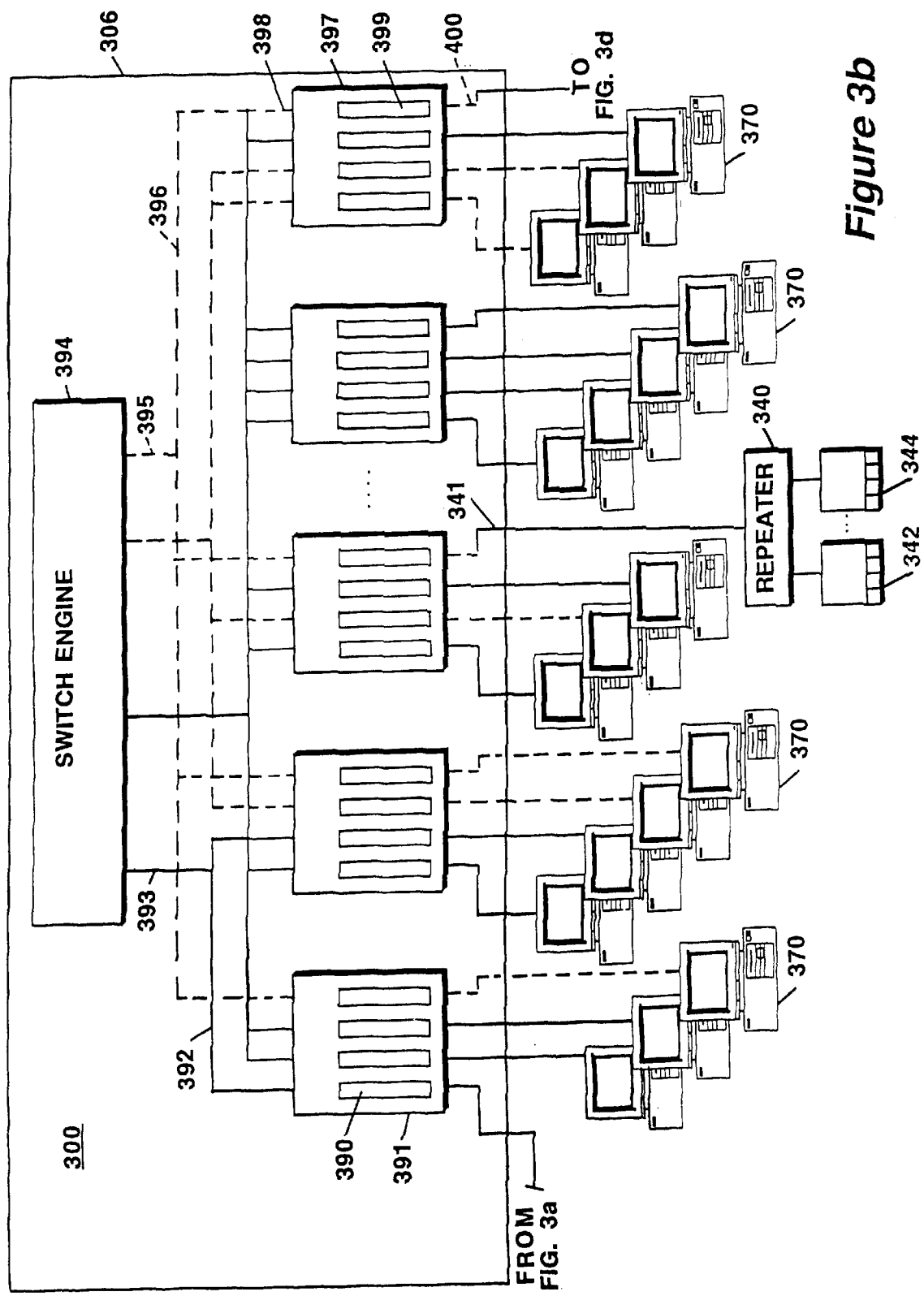
Figure 3C:
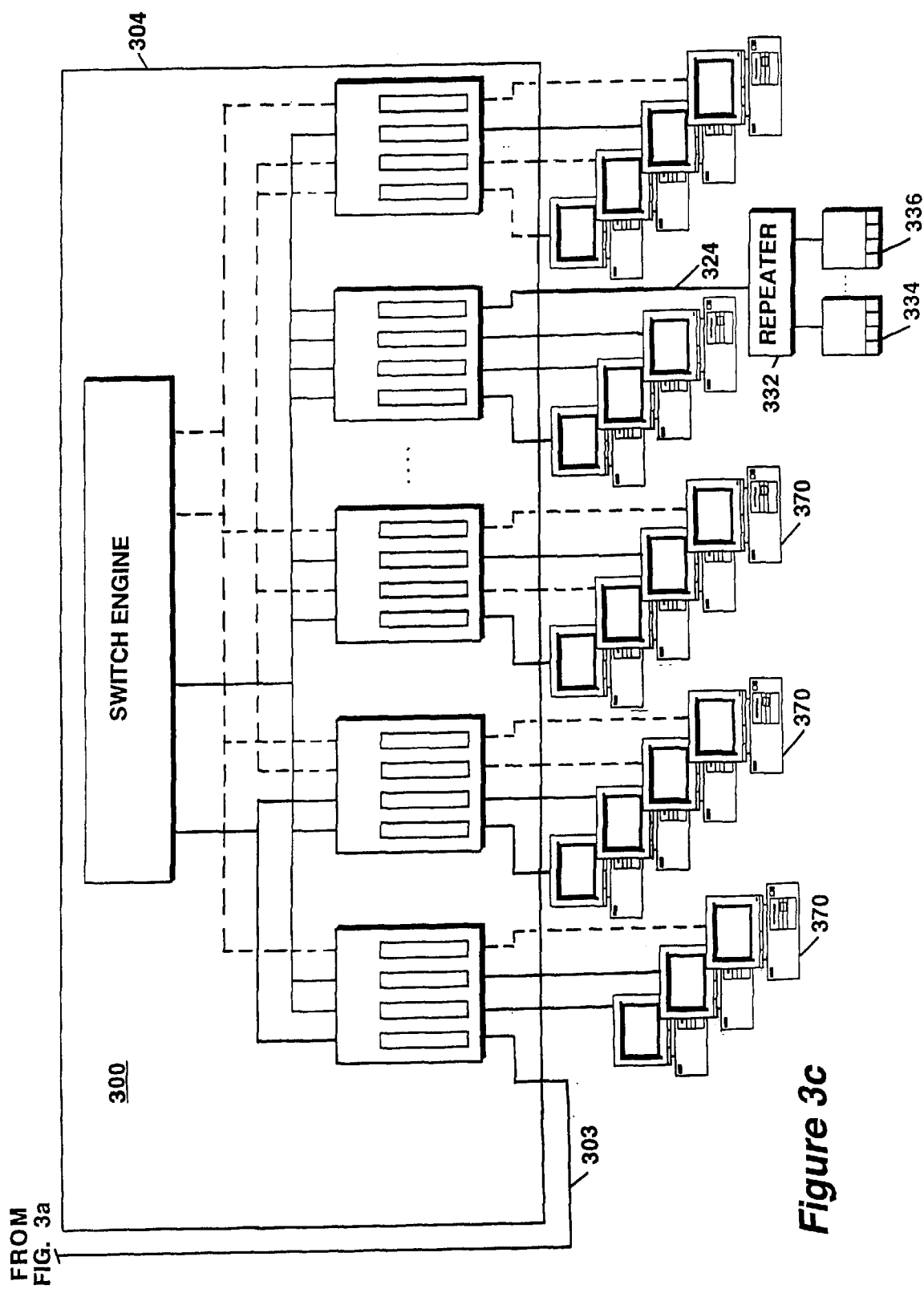
Figure 3D:
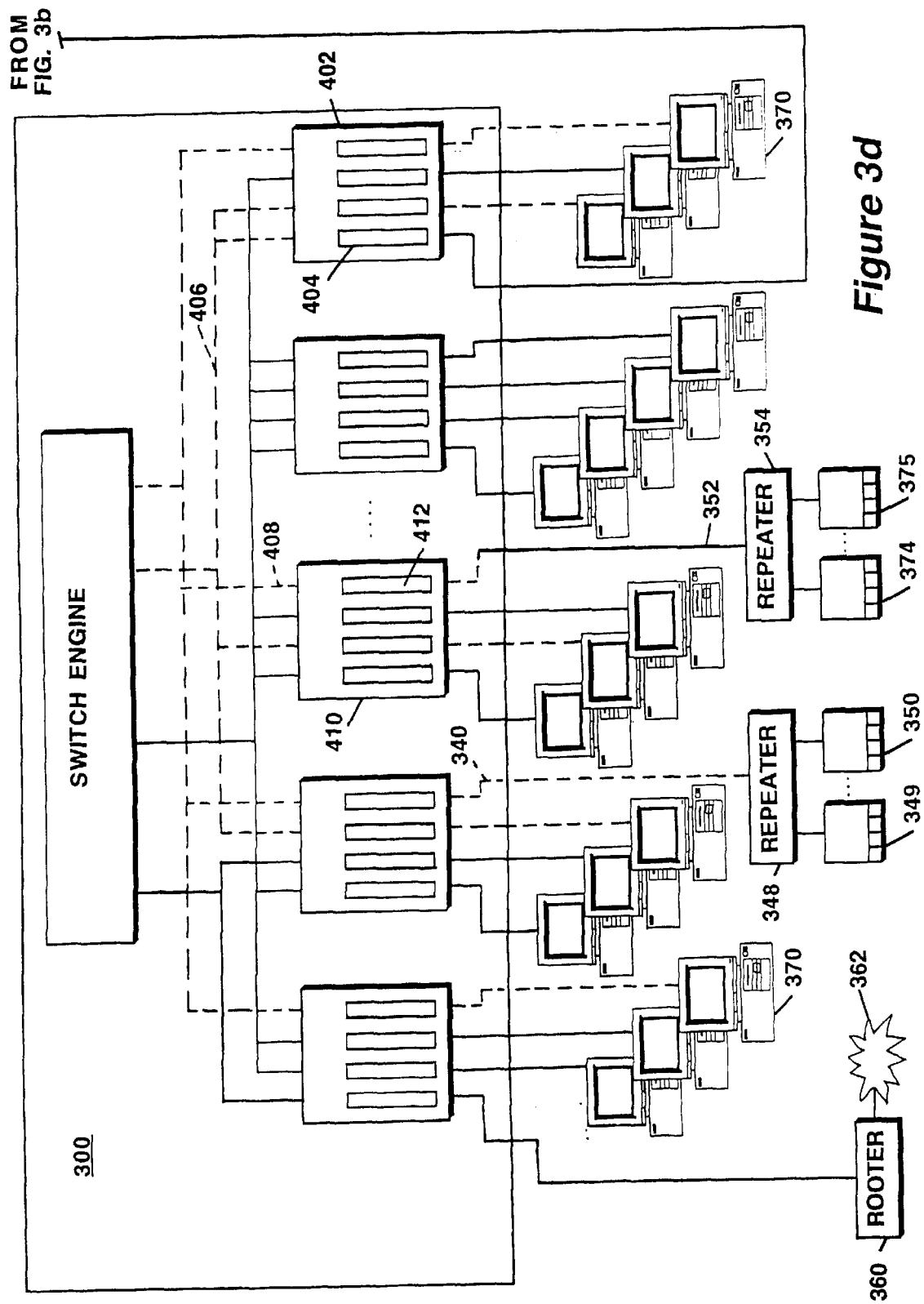

Turning now to FIG. 2, there is shown a block diagram of the internal architecture of hub 202. The hub is a switched repeater, referred to as a SREP repeater. The SREP repeater uses Semiconductor Buffered Repeater Chips, referred to as BREP chips. Semiconductor Buffered Repeater Chips (BREP chips) 204A, 204B, 204C, 204(N−1), 204N provide Ethernet ports for hub 202. For example, each BREP chip provides four (4) Ethernet ports. For example, BREP chip 204A has Ethernet ports 204A-1, 204A-2, 204A-3, 204A-4. Each of these Ethernet ports may, for example, be adjusted to operate at 10 megabits per second or at 100 megabits per second. Likewise, for example, each of the BREP chips 204A, 204B . . . 204N in hub 202 has four Ethernet ports, as shown in FIG. 2.

Each port, for example 204A-1, 204 A-2, 204 A-3, 204 A-4, of BREP chips 204A is an independent collision domain operating in accordance with the ANSI/IEEE Standard 802.3, also known as the ISO/IEC 8802-3 standard, as set forth in the Fifth edition 1996-07-29, all disclosures of which are incorporated herein by reference. An architecture for a network operating at 10 megabits per second and 100 megabits per second is shown in FIGS. 29.1 and 29.2 of the IEEE 802.3, ISO 8802-3 CSMA/CD Standard. That is, each of the ports provides a carrier sense multiple access with collision detection (CSMA/CD) access method, and each port provides an independent collision domain.

As an example, independent LANs provided by each port of a BREP chip is illustrated in FIG. 2. At BREP chip 204A there is a workstation connected to Ethernet ports 204A-1, 204A-2, and 204A-4. Ethernet port 204A-2 is connected to Ethernet repeater 205, and Ethernet repeater 205 is in turn connected to a plurality of workstations indicated as PC1 . . . PCN. BREP chip 204B is illustrated by having the ports 204B-1, 204B-3, and 204B-4 connected to workstations, and port 204B-2 connected to an Ethernet Repeater 206. The Ethernet Repeater 206 is in turn connected to a plurality of workstations, indicated by the symbol PC1–PCN. By way of example, BREP chip 204C is indicated as connected to workstations at Ethernet ports 204C-1, 204C-2, and 204C-3, and to router 207 at Ethernet port 204C-4. In turn, router 207 connects a wide area network as illustrated by network cloud 207-1. Likewise, BREP chip 204(N−1) connects to four workstations. And finally, by way of example, BREP chip 204N is shown connected to workstations at its first, second and third ports, while being connected to an Ethernet Repeater 208 at port 254. Ethernet Repeater 208 is then connected to a plurality of workstations, indicated by the symbols, PC1–PCN. Each Ethernet port of each BREP chip of hub 202 connects to an independent collision domain as illustrated above: sometimes to a single workstation; sometimes to an Ethernet repeater illustrated as Ethernet repeaters 205 206 208, and then to a plurality of workstations; and, sometimes to a router, illustrated as router 207, connecting to a wide area network as illustrated by network cloud 207-1.

Also, the BREP chip has a Media Independent Interface (MII) ports or symbol ports that can be connected to a Physical Layer (Phy) device, for example, for operation at either 10 mega-bits per second or operation at 100 mega-bits per second.

Alternatively, the BREP chip can be connected to, for example, a Symbol Phy device for operation at 100 mega-bits per second. The PHY device is connected to the physical media using one bit datapath for receive operation, and one bit datapath for transmit operation.

Accordingly, the BREP chip may be connected to a variety of physical layer devices as are specified in the applicable standards, for example, the standards Standard IEEE 802.3, ISO 8802-3 CSMA/CD Local Area Network standards.

The internal architecture of a BREP chip is arranged so that each Ethernet port is independent of the other Ethernet ports. Each Ethernet port has a transmit buffer and a receive buffer, indicated for BREP chip 204A, by the rectangles 210, 212, 214, 216. The transmit buffers and the receive buffers are described in more detail hereinbelow, especially in connection with FIG. 11 and FIG. 12. Because of lack of space in FIG. 2 and FIG. 3, a single rectangle will be used to indicate the "transmit and receive" buffers. When a receive function is discussed, the rectangle will be referred to as a receive buffer. When a transmit function is discussed, the rectangle will be referred to as a transmit buffer. The individual "transmit and receive" buffers are described in more detail with reference to FIG. 11 and FIG. 12.

Data associated with Ethernet port 204A-1 is stored in "transmit and receive" buffer 210. Data associated with Ethernet port 204A-2 is stored in "transmit and receive" buffer 212. Data associated with Ethernet port 204A-3 is stored in "transmit and receive" buffer 214. Data associated with Ethernet port 204A 4 is stored in "transmit and receive" buffer 216. Data stored in a "transmit and receive" buffer may be waiting to be transmitted out through its associated Ethernet port, or it may have been received from the Ethernet port.

Each Ethernet port of a BREP chip can be associated to any one of the 4 segment ports, but to only one at a specific time. For example, Ethernet port 204A-1 has the associated segment port 220. Ethernet port 204A-2 has associated segment port 222. Ethernet port 204A-3 has associated segment port 224. Ethernet port 204A-4 has associated segment port 226. Each of the segment ports, for example, may be eight (8) bits wide. Each segment port of a BREP chip is independent of the other segment ports.

The hub 202 contains, for example, four (4) segment busses 230, 232, 234, 236. Each of the segment busses has, for example, an eight-bit wide data path. A segment bus may have any number of BREP segment ports attached thereto. Each BREP chip port may be associated with any one of the segment busses through control within the BREP chip, and in response to management messages received by the BREP chip.

Access to the segment bus 230, 232, 234, 236 is controlled by an arbitration mechanism (not shown). In addition to an eight (8) bit wide data path for each segment bus, the segment bus also contains arbitration lines (not shown) for operating the arbitration mechanism, and clock lines (not shown) to operate data transfers along the segment busses.

"Transmit and receive" buffers 210, 212, 214, 216 in BREP chip 204A, and the equivalent "transmit and receive" buffers in each of the other BREP chips, provide buffering between the Ethernet collision domain of their respective Ethernet ports and their respective segment busses 230, 232, 234, 236. As mentioned above, buffers 210, 212, 214, 216 in BREP chip 204A are shown in FIG. 2 as a single rectangle for clarity in the drawing, but each buffer has both a transmit buffer and a receive buffer, as shown in more detail with reference to FIG. 11 and FIG. 12. For example, data received at Ethernet port 204A-1 is written to the receive portion of "transmit and receive" buffer 210. The receive portion of the "transmit and receive" buffer 210 is then drained by the data being broadcast through segment port 220 to segment bus 236. Correspondingly, any data broadcast onto segment bus 236 by another BREP chip may be written to the transmit portion of "transmit and receive" buffer 210, and later the transmit portion of the "transmit and receive" buffer 210 is drained by the data being transmitted through Ethernet port 204A-1 onto the Ethernet collision domain attached to Ethernet port 204A-1.

The data "may" be written into the transmit portion of "transmit and receive" buffer 210 from the broadcast on the segment bus because the BREP chip has filtering capability. Filtering capability gives the BREP chip the ability to load into its transmit queue from the segment bus only those packets having a destination address present on the Ethernet collision domain, or LAN, of the associated Ethernet port.

By way of example, segment bus 230 is shown attached to: the segment ports of BREP chip 204A at segment port 222 and segment port 224; to BREP chip 204B at segment port 204B-S1; to BREP chip 204C at segment port 204C-S1 and segment port 204C-S3; and, to BREP chip 20 (N–1) at all four of its segment ports, 204(N–1)-SP.; and finally, for example, segment bus 230 is connected to BREP chip 204N at its segment port 204N-3.

Segment buses 232, 234, and 236 are shown by way of example, connected to various ports of BREP chip 204A through BREP chip 204N.

Data is broadcast on each segment bus at a rate governed by an internal clock (not shown) of hub 202. However, segment bus 230 connects, through the BREP chips, to LANs which are independent Ethernet collision domains operating at 10 megabits per second. Segment buses 232, 234, and 236 connect to Ethernet collision domains operating at 100 megabits per second.

Next will be discussed the transfer of a message having a destination address such that it can reach the destination collision domain from the same segment bus connected to the source collision domain. The messages are transmitted from a first collision domain by being received at a receiving BREP chip Ethernet port and the message being stored in a receive buffer. The receive buffer is then drained onto the corresponding segment bus and is broadcast to all BREP chip segment ports attached to that segment bus. The data is detected by all of the segment ports attached to the segment bus. The data is loaded into a segment port transmit buffer after filtering, and is loaded by only those ports of BREP chips permitted by the filtering. Loading the packet into the transmit buffer of a port of a BREP chip places the packet in the transmit queue of that port. Filtering may permit loading of the packet by one or more BREP chip segment ports, based on the destination address of the packet: that is there may be a unique destination address; the packet may be a multicast packet; or for example, the packet may be a broadcast packet. Reception of the packet is based on address filtering by the BREP chips. The transmit buffers receiving the packet are then drained by the packet being transmitted through the associated Ethernet port onto its Ethernet LAN.

The port and buffer connections will now be described, as an example, for BREP switch 204A. Each Ethernet port 204A-1, 204A-2, 204A-3, 204A-4 operates with its associated segment port, as follows:

Ethernet port 204A-1 connects to "transmit and receive" buffer 210, and "transmit and receive" buffer 210 connects to segment port 220;

Ethernet port 204A-2 connects to "transmit and receive" buffer 212, and "transmit and receive" buffer 212 connects to segment port 222;

Ethernet port 204A-3 connects to "transmit and receive" buffer 214, and "transmit and receive" buffer 214 connects to segment port 224;

Ethernet port 204A-4 connects to "transmit and receive" buffer 216, and "transmit and receive" buffer 216 connects to segment port 226.

The segment ports then connect, by way of example, to the segment busses 230, 232, 234, 236 as follows:

segment port 220 connects to segment bus 236;
segment port 222 connects to segment bus 230;
segment port 224 connects to segment bus 230;
segment port 226 connects to segment bus 232.

In this particular example, segment bus 234 does not connect to any segment port of BREP chip 204A, but does connect to segment ports of BREP chips 204B, 204C, and 204N.

The segment busses 230, 232, 234, 236 are labeled by the mega-bits per second (10 or 100) which their associated Ethernet ports, and also external Ethernet collision domains 235 operate. Also, the corresponding switch engine ports are labeled by the mega-bits per second (10 or 100) at which their corresponding Ethernet collision domains 235 operate.

In accordance with the description of the operation of hub 202, there will now be described the mechanism by which an Ethernet packet may be transferred from a first segment bus to a second segment bus. Transfer of an Ethernet packet from a first segment bus to a second segment bus is done by switch engine 240. Switch engine 240, by way of example, is shown having four (4) ports 242, 246, 248, 250. Segment bus 230 is shown connecting to switch engine port 246. Segment bus 232 is shown connecting to switch engine port 250.

Also, segment bus 232 connects: to BREP chip 204A at segment port 226; to BREP chip 204B at segment port 204B-S4; to BREP chip 204C at segment port 204C-S4; and, to BREP chip 204N at segment port 204N-S4.

For example, an Ethernet packet entering BREP chip 204A at Ethernet port 204A-2, by being originated from the collision domain attached to Ethernet port 204A-2, is first stored in receive buffer 212. The stored packet is then drained from receive buffer 212 onto segment bus 230 where it enters switch engine 240 at port 246. From port 246 the packet may be switched, by way of example, by switch engine 240 to switch engine port 250, and then onto segment bus 232. From segment bus 232 the Ethernet packet is broadcast to all of the segment ports of the BREP chips attached to segment bus 232, including for example, segment port 204N-4 of BREP chip 204N. Assuming that the packet destination address is located in a computer on the Ethernet collision domain connected to Ethernet port 254, then the packet is stored in transmit buffer 252. From transmit buffer 252 the packet is transmitted through Ethernet port 254 to Ethernet repeater 208. From Ethernet repeater 208 the packet is broadcast to PC1, PC2, ... PCN. The workstation, say for example PC1, having the destination address of the packet then receives the packet.

By way of example, segment bus 230 is shown in FIG. 2 to be operating at 10 megabits per second. Segment bus 230 connects to: BREP chip 204A at segment port 222 and segment port 224; BREP chip 204B at segment port 204B-1; BREP chip 204C at segment port 204C-1 and segment port 204C-3; BREP chip 204(N−1) at all four segment ports 204(N−1)P; and finally, BREP chip 204N at segment port 204N-3. Accordingly, each local area network (LAN), which is an Ethernet collision domain, attached to an Ethernet port corresponding to one of these segment ports is operated at 10 megabits per second, including the aforementioned LAN attached to Ethernet port 204A-2. Switch engine port 250 is shown operating at 100 megabits per second, as is segment bus 232. Accordingly, all LANs attached to Ethernet ports having their corresponding segment port attached to segment bus 232 operate at 100 megabits per second, including the LAN attached to BREP chip 204N at its Ethernet port 254. Accordingly, the workstations PC1 through PCN, which are attached to repeater 208, operate through the 100 megabits per second Ethernet LAN attached to BREP chip 204N at Ethernet port 254.

"Transmit and receive" buffer 252 and "transmit and receive" buffer 212 make it possible for Ethernet packets to be transferred between LANs having different operating bit rates. A packet will next be traced from the Ethernet LAN of BREP chip 204A at Ethernet port 204A-2 to a destination on BREP chip 252 at Ethernet port 254, and also in the reverse direction. For example, when a packet originates from the 10 megabit per second LAN connected to Ethernet port 204A-2, the receive buffer 212 is filled at a 10 megabit per second rate. The packet is drained from the receive buffer 212 at the segment bus rate, and the packet enters switch engine 240 at switch engine port 246. The packet is switched by switch engine 240 from switch engine port 246 to switch engine port 250. At switch engine port 250 the packet travels on segment bus 232 to transmit buffer 252 of BREP chip 204N at the segment bus clock rate. The complete packet is stored in transmit buffer 252. Transmit buffer 252 is then drained at 100 megabits per second by transmission through Ethernet port 254 onto the 100 megabit per second LAN where it goes to repeater 208. The packet is repeated by repeater 208 at the 100 megabits per second bit rate to the workstations PC1–PCN attached to repeater 208.

For an Ethernet packet originated from a workstation such as PC2 connected to repeater 208, the packet is stored into receive buffer 252 of BREP chip 204N at a 100 megabit per second bit rate. Switch engine 240 then provides a connection from its port 250 to its port 246 for the Ethernet packet having a destination address on Ethernet port 204A-2. The data is broadcasted at the bus clock rate from BREP chip 204N to transmit buffer 212 of BREP chip 204A. The transmit buffer 212 is then drained at the lower 10 megabit per second rate as the packet is transmitted out through Ethernet port 204A-2 of BREP chip 204A to Ethernet repeater 205.

Turning now to a discussion of the internal architecture of switched repeater 202, a packet entering switch repeater 202 and having a destination address which can be reached by broadcast of the packet by the segment bus connected to the corresponding input segment port need not be switched by switch engine 240. That is, a single segment bus is connected to the segment port of the input Ethernet port, and is also connected to the segment port of the outgoing Ethernet port. However in contrast, for an Ethernet packet entering a BREP chip and being broadcast onto a first segment bus that does not reach the destination address of the packet, the switch engine 240 will switch the Ethernet packet to a segment bus having an apparatus with the required destination address communicating therewith, through a corresponding Ethernet port.

Turning now to FIG. 3, there is shown a more complex network 300 including four (4) hubs. For example, the network shown in FIG. 3 could serve as the building network 101 of FIG. 1. The topology of network 300 will now be described. In reference to the topology of the network 300, hub 302 is connected by link 303 to hub 304, and also hub 302 is connected by link 305 to hub 306. Hub 306 is connected by link 307 to hub 308. Link 303, 305, and 307 may be any convenient message transmission medium. For example, link 303, 305, 307 could be twisted pairs, optical fiber links, telephone link connections, coaxial cable, ... etc.

The networks connected to each hub are complex, as is illustrated by the connection of repeaters to various of the Ethernet ports of the hubs 302 304 306 308. For example, Ethernet repeater 312 is connected to port 314 of hub 302. Ethernet repeater 312 is connected to a plurality of workstations, illustrated by way of example, by workstations 316, . . . 318. Also repeater 320 is connected to port 322 of hub 302. Repeater 320 is in turn connected to a plurality of workstations 323 . . . 324. Additionally, port 326 is connected to router 328. Router 328 is in turn connected to a wide-area network illustrated, by way of example, by the network cloud 330.

By further way of example, repeater 332 is connected to port 324 of hub 304. Repeater 332 is in turn connected to a plurality of workstations 334 . . . 336.

By further way of example, hub 306 at Ethernet port 341 connects to repeater 340. Repeater 340, in turn, is connected to a plurality of workstations 342 . . . 344.

Hub 308 is connected at port 346 to repeater 348. Repeater 348 is then connected to a plurality of workstations 349 . . . 350. Hub 308 is connected at port 352 to repeater 354. Repeater 354 is connected to a plurality of workstations 374 . . . 375. Also, by way of example, hub 308 is connected to router 360. By way of example, router 360 is in turn connected to a further wide-area network illustrated by network cloud 362.

FIG. 3, by way of example, illustrates hub 302, 304, 306, 308, having ports connected to a wide variety of apparatus. For example, hub 302 is connected to a plurality of independent workstations 370. Reference numeral 370 is used to designate independent workstations attached to various of the hubs 302, 304, 306 and 308. Each independent workstation 370 is on a different collision domain, as described hereinabove with reference to FIG. 2.

In addition to being connected to independent workstations, hubs 302, 304, 306, 308 are connected to a variety of apparatus, including repeaters, 312, 320, 340,332, 348, and 354; routers 328, 360. And hubs are connected to other hubs: for example, hub 302 connects to hub 304 through the link 303; hub 302 connects to hub 306 through link 305; and, hub 306 connects to hub 308 through link 307.

As an example of operation of network 300, a data packet will be traced from a source workstation to a destination workstation. For example, workstation 316, connected through repeater 312 to hub 302, transmits a message having the destination address of workstation 374, connected through repeater 354 at port 352 to hub 308. Workstation 316 transmits the data packet to repeater 312. In this example, as an illustrative example, it is assumed that a repeater 312, 320, 332, 340, 348, and 354 operates as follows: a repeater receives a packet on one port and broadcasts that packet to all of its other ports. Accordingly, by way of example, a packet transmitted by workstation 316 is received by repeater 312, and repeater 312 broadcasts the packet so that it is received at port 314 of hub 302. Upon reception, the packet is written into receive buffer 376 of BREP chip 378. Receive buffer 376 is then drained through segment bus 379. Segment bus 379 connects to switch engine port 380 of switch engine 382. Switch engine 382 interprets the destination address of the packet, and accordingly, switches the packet to its port 384. From port 384 BREP chip 385 loads the packet at its segment port 386. From segment port 386 the packet is written into transmit buffer 387. Transmit buffer 387 is drained by transmission of the packet onto link 305. From link 305 the packet is written into receive buffer 390 of BREP chip 391. Receive buffer 390 is drained by the packet being broadcast onto segment bus 392. The packet is loaded at switch engine port 393 of switch engine 394. Switch engine 394 interprets the destination address of the packet and switches the packet to its port 395. From port 395 the packet is broadcast onto segment bus 396. BREP chip 397 loads the packet at its segment port 398, where the packet is written into transmit buffer 399. Transmit buffer 399 is drained by transmission of the packet through port 400 onto link 307. Link 307 conducts the packet to BREP chip 402, where the packet is written into receive buffer 404 of BREP chip 402. Receive buffer 404 is drained by broadcast of the packet onto segment bus 406. Segment bus 406 connects, in turn, to segment port 408 of BREP chip 410. BREP chip 410 loads the packet, in response to the destination address of the packet, at its segment port 408, and the packet is written into transmit buffer 412 of BREP chip 410. Transmit buffer 412 of BREP chip 410 is drained by the packet being transmitted through Ethernet port 352, and the packet is received by repeater 354. Repeater 354 transmits the packet to all of the workstations connected to repeater 354, and the packet is received by the intended destination workstation 374.

Automatic Recognition of an Apparatus Connected to a Hub Port

The automatic detection, by a port of a BREP chip in a hub, of the type of apparatus connected to that port will now be described. Turning now to FIG. 4, there is illustrated a standard Ethernet packet of the type described in the Ethernet Standard ANSI/IEEE Standard 802.3, Fifth Edition, 1996-07-29, also ISO/IEC 8802-3.

Preamble 450 is a seven (7) byte field. Field SFD 452 is a one (1) byte field.

Field DA 454 is the destination address field of the packet and is a six (6) byte field, where the field holds the address of the destination workstation.

Field SA 456 is the source address field of the packet and is a six (6) byte field, where the field holds the address of the source workstation.

Field "Length" 458 gives the length of the data field of the packet and is a two (2) byte field in IEEE 802.3 packet format indicating length from 0 to 1500 decimal. In "Ethernet format" length field 458 is a protocol type field having a "value" >1500 decimal.

Data field 460 is a field having variable length, where the length is specified by the number in field 458 in IEEE 802.3 format.

PAD field 459 is all zeros and forces the packet length to be 64 bytes, and is present when the data is insufficient to make the packet 64 bytes long. Accordingly, the PAD field may be of length between 0 and 46 bytes. The length field 458 specifies the length of the data exclusive of PAD.

FCS 462 is the frame control sequence field and is four (4) bytes in length.

The minimum packet size recognized by apparatus constructed according to the Ethernet standard is sixty-four (64) bytes. A packet having less than 64 bytes is referred to as a "runt" packet. Apparatus constructed in accordance with the Ethernet standard is normally designed to discard runt packets. The detection and rejection of a runt packet is not reported by the apparatus as an error, as there are a number of event sequences which lead to the production of a runt packets, such as, for example, a collision in half duplex Ethernet. The apparatus simply discards any runt packet which it detects.

Turning now to FIG. 5, there is shown a control packet 500 for use in automatic detection of the type of apparatus attached to a port of a BREP chip. Fields of the control packet include the preamble field 502 which is a seven (7) byte field.

Field SFZ 504 is a one (1) byte field. Details of field SFZ 504 will be discussed hereinbelow with reference to FIG. 7A–FIG. 7G. Field SFZ 504, in a preferred embodiment of the invention, permits a BREP chip to recognize that a received packet came from a device having the capabilities of a BREP chip.

DA field, the destination address field 454 is labeled with the same reference numeral as the DA field of FIG. 4 because the destination address of the standard packet is utilized in the destination address of the control packet. Source address field 456 is labeled with the same reference numeral as the source address field SA of FIG. 4 because the control packet uses the standard source address as described in the Ethernet standard.

Lengthtype field 506, in a preferred embodiment of the invention, is used as a TYPE field using Ethernet format. The TYPE field is programmable, so a special TYPE value distinguishes a control frame from a normal frame.

OpCode field 510 carries an operations code recognized by a receiving port of a BREP chip, and is two (2) bytes in length. The op-code field is programmable, and for an exemplary embodiment of the invention the op-codes of the following table may be used.

A Table of op-codes for field 510 follows:
- 05 Half Duplex with credit flow control
- 06 Full Duplex with credit flow control
- 15 Half Duplex with credit flow control, with max packet=4K bytes
- 16 Full Duplex with credit flow control, with max packet= 4K bytes
- 25 Half Duplex with credit flow control, with compressed data (1518 max packet)
- 60 Full Duplex with credit flow control, with compressed data (4K Bytes max packet)

Table of OP-CODES for control packet.

Credit field 512 carries credit for use in a credit based flow control mechanism which may be established between a first hub having a BREP chip and a second hub connected to a port of that BREP chip, where the second hub uses BREP chips.

Padding field 514 contains sufficient bytes to make the control packet 64 bytes in length. Accordingly, padding field 514 contains forty-two (42) bytes. FCS field 462, the frame control sequence field, is labeled with the same reference numeral as the standard packet shown in FIG. 4 because the frame control sequence field usage is in accordance with the Ethernet standard.

FIG. 6 is a table giving the fields of control packet 500. In the control packet, the total number of bytes is 64, and the padding of 42 bytes is used to ensure that the length of the control packet is sufficient so that it is not a runt packet.

Turning now to FIG. 7A through FIG. 7G, there is shown: the content of preamble field 450 and SFD field 452 (shown in FIG. 4) of the standard packet; and the preamble field 502 and the SFZ field 504 of control packet 500. The content of these fields from FIG. 4 is shown in greater detail in FIG. 7A–FIG. 7G.

Figure 7A:
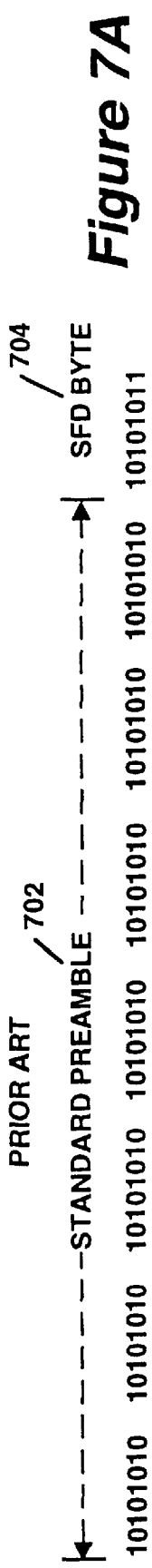
FIG. 7A is an introductory bit sequence for a standard data packet.

In FIG. 7A a standard preamble 702 is shown. Also, in FIG. 7A, a standard SFD 452 byte is shown in field 704. It is noted that the standard preamble 702 is made up of seven (7) identical bytes with the following: "10101010" bit pattern. Further, as shown in FIG. 7A, the standard SFD byte is 10101011.

When an apparatus built in accordance with the Ethernet standard receives at least seven (7) bytes of the standard preamble, that is 56 repeating "10" symbols, followed by a single SFD byte, the apparatus recognizes that the destination address field 454 immediately follows the "11" content of the SFD byte.

Figure 7B:
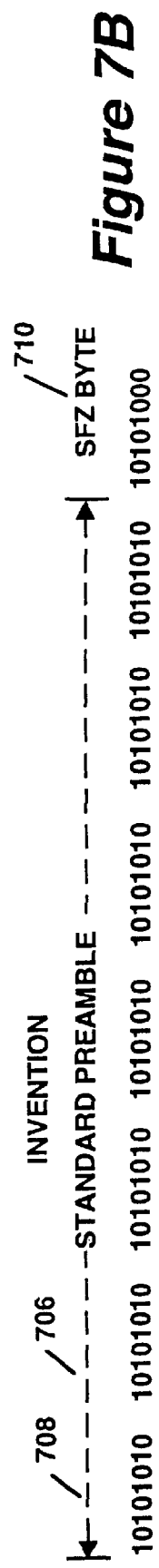

In a preferred embodiment of the invention as shown in FIG. 7B, the preamble 706 of the control packet 708 is identical with the standard preamble 702 shown in FIG. 7A. However, the SFZ byte 504, shown in FIG. 7B as field 710, is as follows:

10101000.

The BREP chip is designed to recognize the SFZ byte 710 after receipt of at least fifty-six (56) bits of repeating "10" of the standard preamble 702. Upon detection by the Ethernet port of the BREP chip that the SFZ byte has been received, the BREP chip interprets the packet as a control packet.

Reception of the control packet guarantees that the other end of a wire connected to the BREP chip port is connected in turn to another BREP chip port. This guarantee flows from the point that any apparatus built according to the Ethernet standard will not forward a control packet. The existence of the SFZ byte in the control packet is sufficient for an apparatus built in accordance with the Ethernet standard to fail to interpret the packet as a "packet". An apparatus built according to the Ethernet standard requires the "11" sequence following a standard preamble. The existence of the "00" sequence of field 710 prevents the apparatus from detecting that a packet has been received.

Further, in reference to FIG. 3, it is seen that ports of a BREP chip may have any number of different types of apparatus attached thereto. For example: a repeater 312, 320, 340, 332, 348, 354 is illustrated as attached to a port of a BREP chip; a router 328, 360 is illustrated as attached to a port of a BREP chip; and two BREP chips are illustrated as being connected together, for example, by links 303, 305, and 307. Further, numerous workstations 370 are shown connected directly to a port of a BREP chip.

No forwarding apparatus such as a bridge, router or switching hub, etc. will forward a packet having a SFZ field, and no workstation will transmit a packet having a SFZ field. Accordingly, when a receiving port of a BREP chip detects the presence of a control packet by detection of the SFZ 710 byte following a standard preamble 702, then the receiving BREP chip port has determined that it is connected to another BREP chip port, as for example by link 303, 305, or 307.

Advanced repeater designs may check a packet for a SFD pattern before forwarding the packet. For example, a repeater functionality is described in the Standard IEEE 802.3u Chap 27, at section 27.3, particularly at paragraphs 27.3.1.3.1 and 27.3.1.3.2. The Chap. 27 repeater responds to a "received event", and generates an output including a preamble including a SFD sequence. In the event that the Chap. 27 repeater always looks for a SFD sequence before repeating a packet, then the Chap. 27 repeater will not repeat a packet having a SFZ byte in the packet header.

However, simple repeater designs simply repeat all bits received on one port by transmitting the bits from all other ports, without checking the bits for any pattern. Such a simple repeater must be excluded from a network using BREP chips, as such a simple repeater will repeat a packet having a SFZ pattern. And a repeater which repeats a packet having a SFZ pattern will confuse two BREP ports which use the SFZ pattern to determine if they are connected by a cable.

Upon detection by a receiving port of a BREP chip that it is connected to a port of another BREP chip, the BREP chip then interprets the fields of the packet containing the SFZ sequence. The receiving port of the BREP chip then interprets field 510 as an operations code, and interprets field 512 as a credit containing field for operation of credit based flow control between the receiving BREP chip and the transmitting BREP chip.

Once a receiving port of a BREP chip has determined that it has connected to a port of another BREP chip, then the receiving chip can take action based upon that determination. Examples of action that can be taken include: establishment of full duplex transmission between the receiving port and the transmitting port; establishment of credit based flow control by use of field 512 to transmit the credits; the establishment of the use of extra long packets, longer than the standard Ethernet packet as permitted by the Ethernet standard, etc.

Figure 7C:
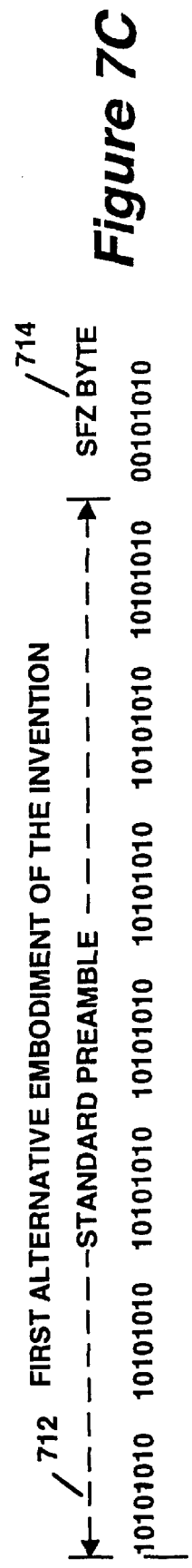

Alternative control packets for alternative embodiments of the invention are set forth in FIG. 7C, FIG. 7D, FIG. 7E, FIG. 7F, and FIG. 7G. For example, in FIG. 7C a First Alternative Embodiment of the invention is shown. In FIG. 7C there is a standard preamble 712. However, a different SFZ byte is used, where the SFZ byte 714 is 00101010. The receiving port of the BREP receiving chip detects a control packet 500 by detecting the presence of a standard preamble, followed by an SFZ byte 714.

Figure 7D:
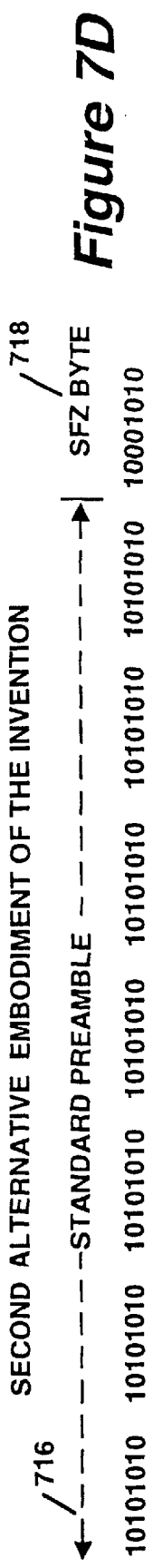

As set forth in FIG. 7D, there is a standard preamble 716. However, a different SFZ byte is used, where the SFZ byte 718 is 10001010. The receiving port of the BREP receiving chip detects a control packet 500 by detecting the presence of a standard preamble, followed by an SFZ byte 718.

As set forth in FIG. 7E, a third Alternative Embodiment of the invention is shown, where the preamble 720 is non-standard and the SFD byte is the standard SFD byte. In the non-standard preamble 720 the seventh byte 774 is non-standard. Byte 774 is 101000010. The receiving port of the BREP receiving chip detects a control packet 500 by detecting the presence of a non-standard preamble having byte 774, followed by a standard SFD byte 772.

As set forth in FIG. 7F, in a fourth alternative embodiment of the invention the sixth byte 776 of the non-standard preamble 775 is non-standard. Byte 776 is 10100010. Also the SFZ byte 778 is non standard, and is 10101000. The receiving port of the BREP receiving chip detects a control packet 500 by detecting the presence of a non-standard preamble byte 776, followed by a non-standard SFZ byte 778.

As set forth in FIG. 7G, in a fifth alternative embodiment of the invention uses a non-standard preamble 780 which has non-standard fifth byte 782. Also, a non-standard SFZ byte 784 is used. The receiving port of the BREP receiving chip detects a control packet 500 by detecting the presence of non-standard preamble 780 and SFZ byte 784.

The various non-standard preambles and SFZ bytes avoid using bit combinations which place two "1" symbols together, as "11" because a receiving apparatus could interpret a "11" pair as the final two bits of a standard SFD byte. After making this erroneous interpretation, the receiving device would begin receiving a packet, starting with the destination address, which in the standard format follows the "11" pair of the SFD byte. A packet so received would be totally spurious. So, the "11" combination is not used in a non-standard preamble or non-standard SFZ byte.

Introductory Bit Sequence

The introductory bit sequence comprising the preamble 450 and Start Frame Delimiter field 452 will be further described. The frame format established by the Standard ISO/IEC 8802-3; (1996E), ANSI/IEEE Std. 802.3, 1996 Edition is as follows:

<inter-frame><preamble><sfd><data><efd>.

A discussion of the invention is simplified by introduction of the following new term:

<introductory-bit-sequence>. The <introductory-bit-sequence> is the two sequences:

<preamble><sfd>. Using the <introductory-bit-sequence> terminology, the frame format is:

<inter-frame><introductory-bit-sequence><data><efd>.

The introductory-bit-sequence, in accordance with the Standard ISO/IEC 8802-3: (1996E), ANSI/IEEE Std., 802.3, 1996 Edition, comprises the preamble and the sfd byte. The preamble is at least seven (7) bytes of "10101010". The sfd byte is the pattern: "10101011".

Turning now to a description of the invention, the preferred embodiment of the invention uses an sfz byte which replaces the sfd byte. For example, in the preferred embodiment, the sfz is one byte of "10101000".

A large number of non-standard bit patterns in the <introductory-bit-sequence> may be used as alternative embodiments of the invention. For example, non standard sequences replacing the sfd sequence may be used, such as, replace the sfd with any one of the following:

"10101000";
"10100010";
"10001010";
"10000010".

As a further alternative embodiment of the invention, a non-standard preamble may be used. In using a non standard preamble, the only physical limitation is that the inventive apparatus be able to perform its internal functions for which preamble bits are used. That is, the only physical requirement is that there be enough "10" . . . repeated patterns for the inventive apparatus to detect the sequence and perform the requirements of paragraph 7.2.3.2 of the ISO/IEC 8802-3: (1996E), ANSI/IEEE Std., 802.3, 1996 Edition, which states in part:

"The DTE is required to supply at least 56 bits of preamble in order to satisfy system requirements. System components consume preamble bits in order to perform their functions. The number of preamble bits sourced ensures an adequate number of bits are provided to each system component to correctly implement its function".

In summary, the introductory bit sequence is needed for the receiving apparatus to initialize to the incoming packet.

The preamble is defined by the standard at paragraphs 4.2.5, and 7.2.3.3, and 22.2.3.2.1 is seven bytes of the pattern: "10101010". Alternative embodiments of the invention using non-standard preambles may include the any of the following alternative patterns for any one of the seven (7) bytes of the preamble:

"10001010";
"10100010";
"10101000";
etc.

As discussed hereinabove, there are many non-standard bit sequences which will both perform the required function of initializing the receiving apparatus, and serve as non-standard introductory bit sequences to inform the receiving apparatus that a control packet has been received, and will also avoid repeated "11" patterns which could fool the receiving apparatus.

Control Packet Length

A control packet length was chosen as the minimum allowed packet length of 64 bytes, so that in the event that a fragment of a control packet should be received by any receiving port of any apparatus which complies with the Ethernet standard, the fragment will be a runt packet. And as mentioned hereinabove, a runt packet is rejected by any apparatus receiving it. Accordingly, the random occurrence of the control packet introductory bit sequence in a data field of a control packet will result in creation of a runt packet, and the runt packet will be rejected by any apparatus complying with the Ethernet standard which receives it, including an Ethernet port of a BREP chip.

Repeater Hardware Description

A repeater chip having both a receive buffer and a transmit buffer is described. Because of the receive buffers and the transmit buffers, the chip is referred to as a Buffered Repeater chip, or a BREP chip. An example of a chip which incorporates the invention described herein is the Digital Equipment Corporation product, Digital Semiconductor 21340 10/100-Mb/s Ethernet Switched Repeater chip.

Notation Conventions

Notation used for bus connections are as follows:

Square brackets denote one of the four Fast Ethernet ports of a BREP chip. For example, REQ[2] is the REQ signal for the fast Ethernet port number 2 of the BREP chip.

Angled brackets denote the bit subscripts for a bus of more than one signal. For example, DATA<7> is the most significant bit in the DATA<7:0> bus.

A packet is received from the physical media into one of the BREP MACs.

A packet is transmitted by one of the BREP MACs to the Fast Ethernet physical side.

One of the BREP MACs broadcasts a received packet towards the other MACs onto the local bus. Other MACs load this broadcasted packet from the local bus into their TX FIFO.

Glossary of Terms

BP—backpressure

MAC—Media Access Control

IPG—inter packet gap: A time gap between packets. For example, the IPG may be 0.96 microseconds, or 96 bit times.

Preamble—a stream of bits preceding the start of a frame transmission, and usually intended to allow synchronization. For the MII, the preamble is defined as 7 consecutive "10101010".

SFD—start frame delimiter: a sequence of bits following the preamble and which marks the start of the frame.

FCTL—flow control.

A packet is loaded to the sender TX_FIFO.

HDX—Half Duplex

FDX—Full Duplex

FIFO—First-In-First_Out Buffer

FCTL_Delay—Flow Control delay

TX—Transmit

RX—Receive

RX_FIFO—receive FIFO buffer.

TX_FIFO—transmit FIFO buffer

Credits—A number (of bytes) each sender receives from the receiver reflecting the amount of free bytes in the receiver RX_FIFO.

A BREP based repeater eliminates network length restrictions, by transforming each of the connected segments into a distinct collision domain handled on the repeater side by a fully featured MAC, with a full packet buffering ability. Each collision domain is an Ethernet local area network, LAN.

In order to avoid loss of packets, the BREP MACs implement a smart backpressure algorithm, which delays the distant node from sending more packets until the BREP buffer frees up from the previous one.

In addition, the BREP provides support for network segmentation, where any combination of grouping and ungrouping ports can be programmed.

The BREP is PHY media independent, and thus allows building repeaters for 100BASE-TX, 100BASE-T4, Fiber or any mix of the above media. The appropriate MAC chip is used for the desired PHY.

Each BREP port can be programmed to support various levels of interconnect. It can be programmed to support either full media independent interface (NM) functionality or 100 Base-X physical coding sublayer (PCS), which includes 4B/5B encoder/decoder, framer and scrambler/descrambler.

Depend on the network port, each BREP port can be programmed to work in either data transfer rate of 10 Mbps or 100 Mbps with the limitation that ports on the same segment should have the same data rate.

Goals of the design which are accomplished in the within disclosure include the following: support for T4, TX and FX media connection through the appropriate PHY device; avoid any deadlock between its ports; reduce packet loss to very marginal cases only; Ability to receive and transmit at the wire speed; support for network segmentation; support for full-duplex flow control connection. In achieving the above goals, the design, for example, does not necessarily achieve total fairness between all ports under any Buffered Repeater configuration.

Features of the within design include, for example, the following:

Four distinct standard MII/Symbol interface ports, each connected to a separate segment (collision domain) supporting CAT3 unshielded twister pair (UTP), CAT5 UTP, shielded twister pair (STP), and fiber cables;

Contains scrambler and PCS per port, for CAT5 to significantly reduce cost of 100 Base-TX solution;

Supports MII management functions;

Supports network port with data rate of 10 Mbps;

Support network port with data rate of 100 Mbps;

One expansion port, to cascade up to 16 BREP chips, summing up to 64 ports in one box;

4 KB receive and 2 KB transmit FIFOs per port;

On chip support for a wide range of external arbitration schemes;

Supports for flow control operation;

Supports for flow-control full duplex operation;

One unicast address filtering capability;

Support for external CAM connection for enhanced address filtering;

Provides external and internal loopback capability;

Support for Repeater MIB;

Support for managed and non managed configurations;

Supports JTAG boundary scan;

Contains 208-pin QFP package.

A description of signals used in the design is given in the following tables, Table 1, Table 2, Table 3, and Table 4. A total of 160 signal pins are used, and the chip package provides 208 pins.

Figure 8A:
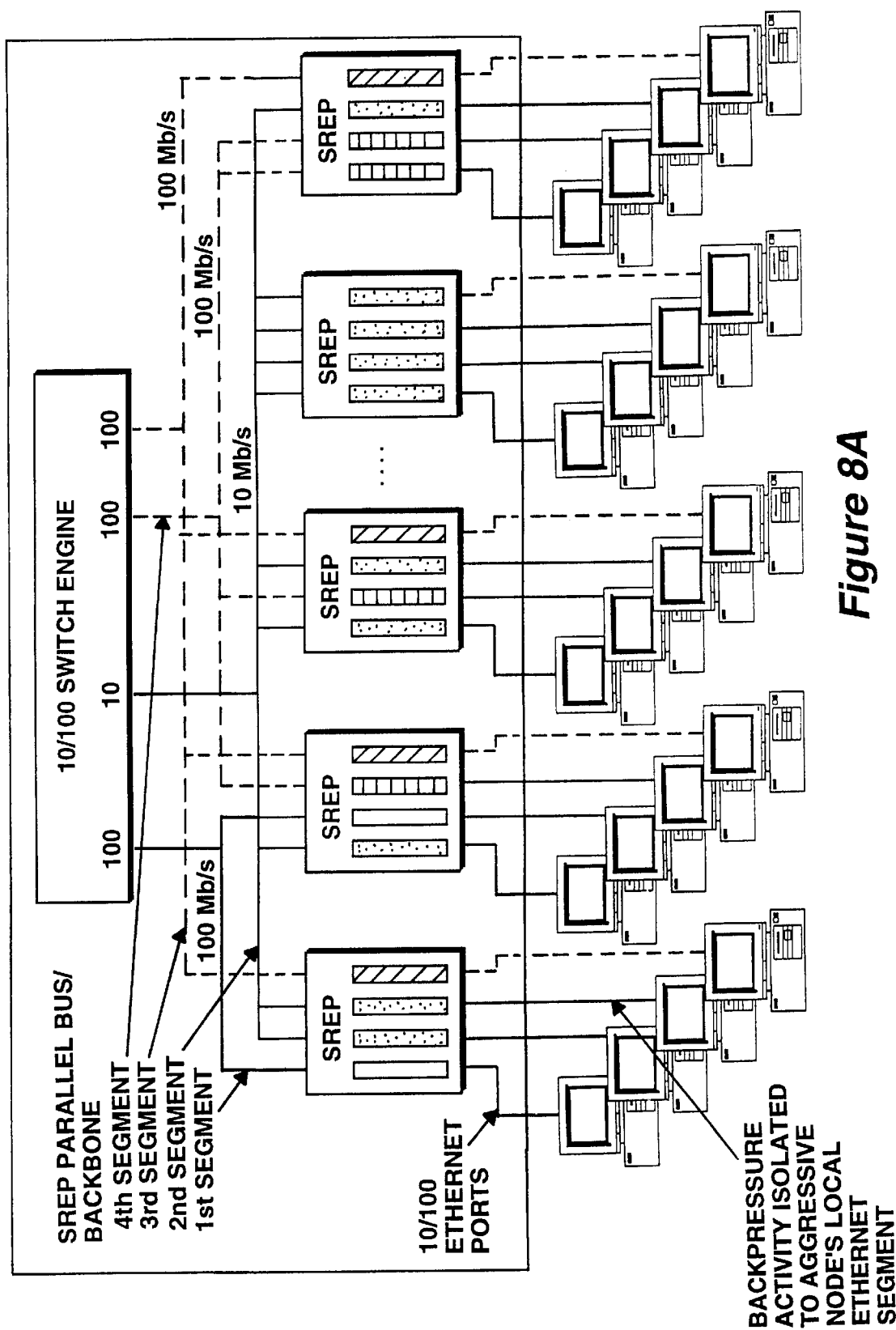
FIG. 8A is a block of a switched repeater having multiple segments in a bus and using BREP chips.

Turning now to FIG. 8A, there is shown a Switched Repeater SREP using a plurality of BREP chips. Multiple segment busses are shown. A switch engine having a plurality of ports is shown. For example, the switch engine shown has three 100 megabit per second ports and one 10 megabit per second ports. A variety of BREP ports are shown attached to each segment bus. The attachment of BREP ports to a segment bus can be changed dynamically by the SREP management unit, as more fully described hereinbelow.

Figure 8B:
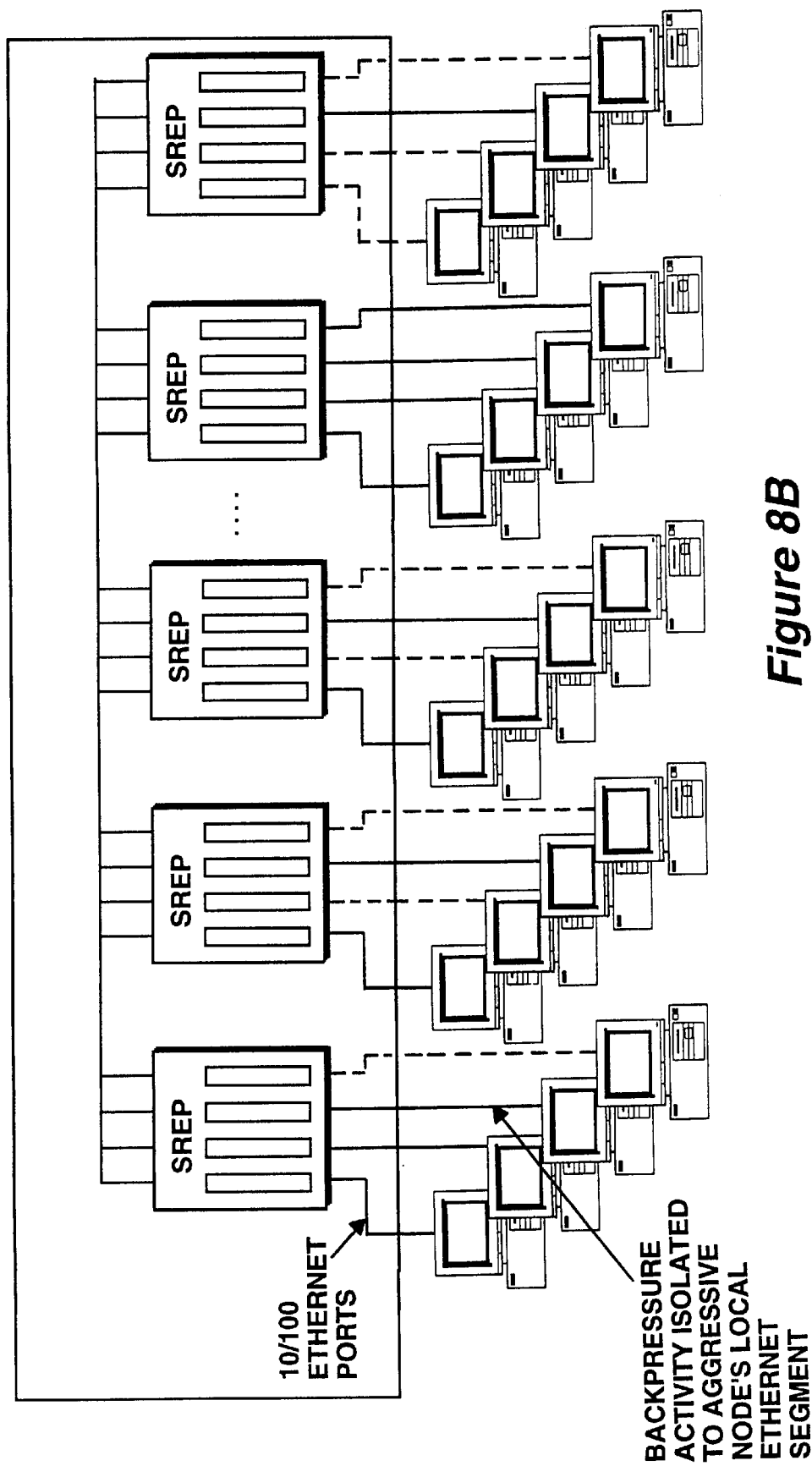
FIG. 8B is a block diagram of a repeater having one segment bus hardwired to a plurality of BREP chips.

Turning now to FIG. 8B, there is shown a repeater having a plurality of BREP chips with one segment bus connected to all of the ports of the BREP chips. In this arrangement all of the Ethernet LANs must operate at the same data rate, for example either at 10 megabits per second or at 100 megabits per second, etc. The segment bus then operates at the chosen megabit per second rate. The repeater arrangement of FIG. 8B may be conveniently employed when it is desired to link a plurality of Ethernet LANs without the requirement that they be on different segments. By not including the switch engine in the repeater, a cheaper repeater for a specific purpose may be by using the BREP chips.

Figure 9:
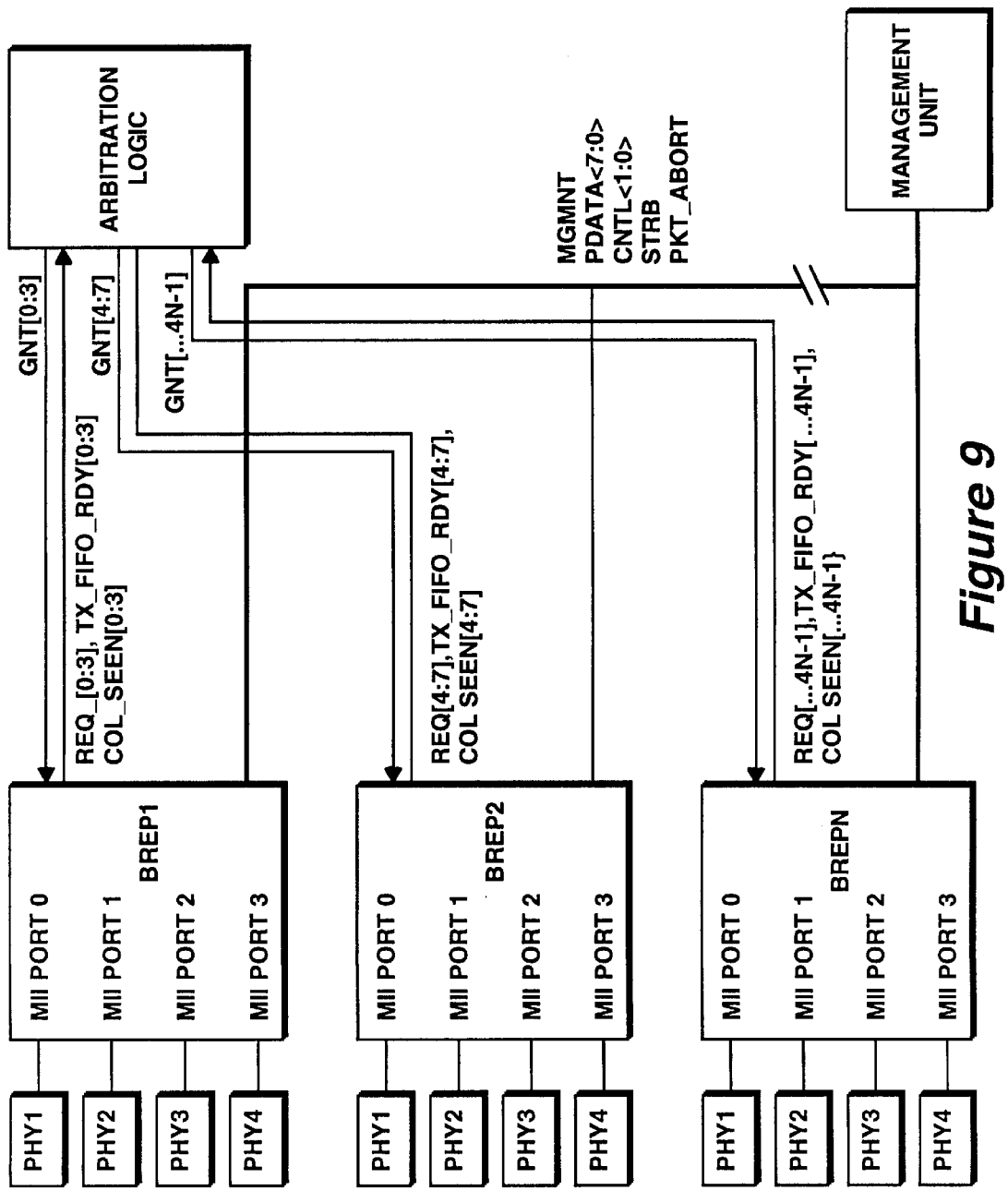
FIG. 9 is a block diagram of a switched repeater system using BREP chips.

Turning now to FIG. 9, there is shown a system overview giving the signal connections in a switched repeater, SREP, using BREP chips. A plurality of BREP chips are shown, designated as BREP1, BREP2, . . . BREPn. Each BREP chip has four ports, indicated as MII Port 0, MII Port 1, MII Port 2, and MII Port 3. Each port is connected to a PHY device. Examples of a PHY device include National Semiconductors product DP8340, and also ICS product PHY 1890.

An arbitration unit is shown, and each BREP chip has the following signal lines connected thereto: GNT for grant, REQ for request, TX_FIFO_RDY to indicate that the transmit FIFO buffer is ready, COL_SEEN to indicate that a collision has been detected. A management unit is shown, and each BREP chip has connected thereto the following signal lines: MGMNT PDATA, CNTL, STRB, and PKT_ABORT_L. The signals are further described in Table 1, Table 2, Table 3, and Table 4.

Figure 10:
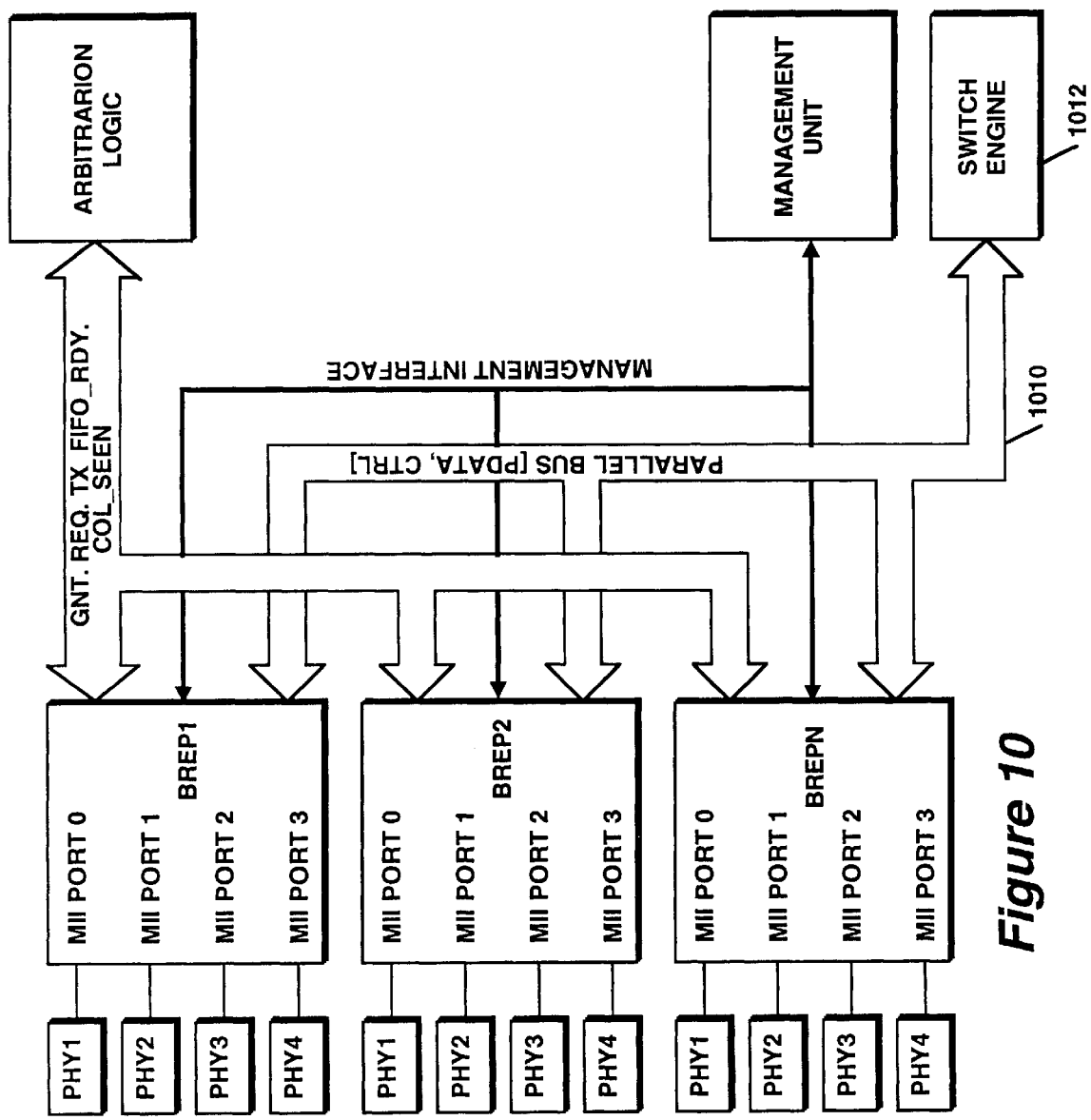
FIG. 10 is a block diagram of signal pathways in a switched repeater using BREP chips.

Turning now to FIG. 10, there are shown signaling pathways in a switched repeater, SREP, using BREP chips. Signaling pathways are emphasized by arrow pathway symbols. Port designations are explicitly indicated. Parallel bus 1010 carries the segment busses. Each segment bus has an eight line data bus PDATA<7:0>, a four line control bus CNTL<1:0>, a strobe STRB, and a packet abort PKT_ABORT_L control lines. The parallel bus 1010 connects to the switch engine 1012. Switch engine 1012 performs the function of bridging a packet from a first segment bus to a second segment bus so that a packet may be transferred from the first segment bus to the second segment bus.

Figure 11:
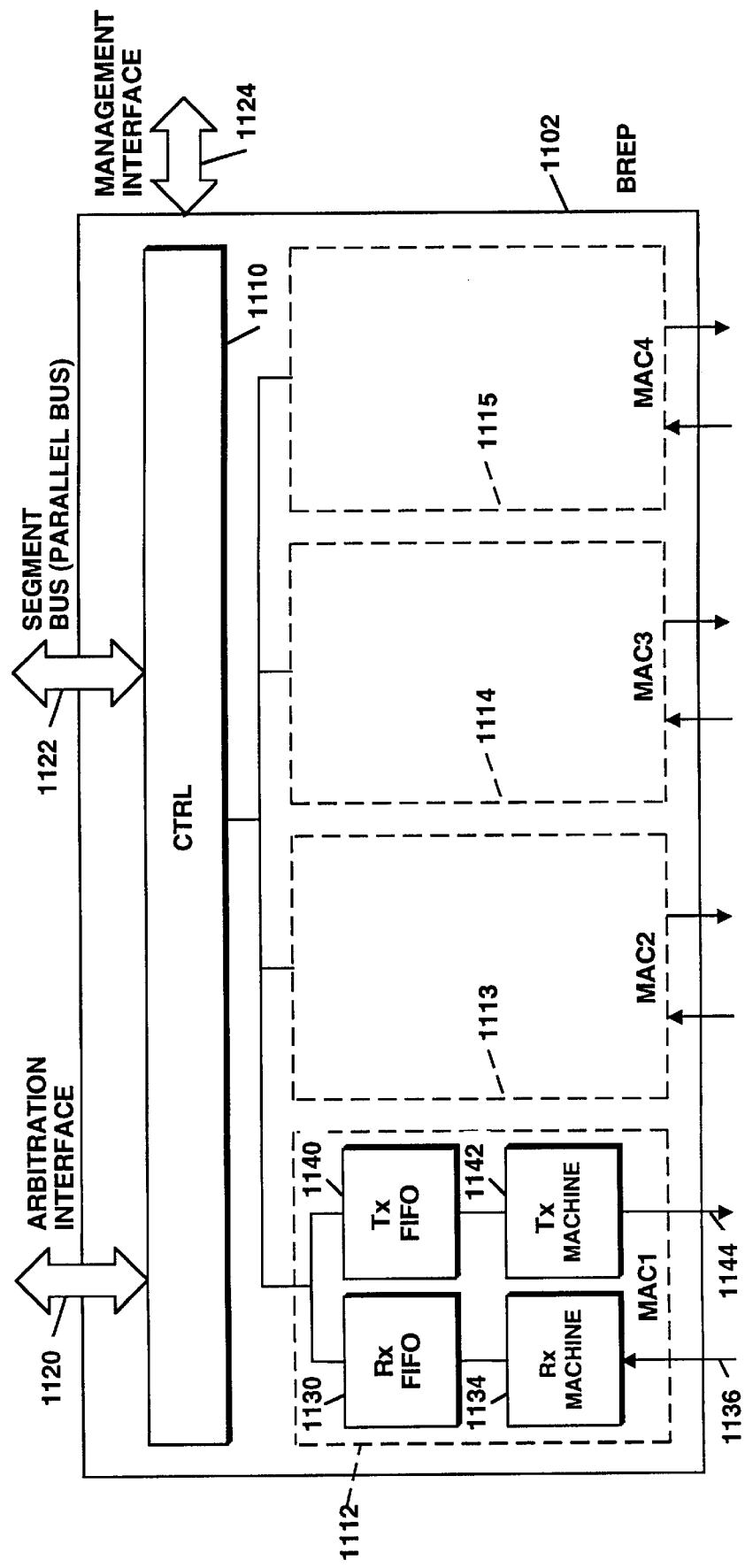
FIG. 11 is a block diagram of a BREP chip showing off-chip signal pathways.

Turning now to FIG. 11 there is shown a block diagram of the internal structure of a BREP chip 1102. Control unit 1110, in response to signals received over the external busses, controls functions of the four BREP chip ports 1112, 1113, 1114, 1115. The arbitration interface connects through the arbitration bus 1120. The segment bus connects through the segment bus interface 1122. Management signals connect through the management interface 1124.

Port 1112 is shown, in block diagram form, having a receive FIFO buffer 1130 and a receive machine 1134. When a packet is received on line 1136 the packet is first processed by receive machine 1134. From receive machine 1134 the packet is loaded into the buffer of receive FIFO 1130. When permitted by control unit 1110, the packet stored in the receive buffer in receive FIFO 1130 is broadcast onto the eight bit wide bus of segment bus 1122.

Also, port 1112 has a a transmit FIFO buffer 1140; and a transmit machine 1142. When control unit 1110 permits, the buffer in transmit FIFO 1140 is loaded from the eight bit segment bus 1122. Then, when permitted by the control unit 1110, the packet stored in the buffer in transmit FIFO 1140 is transmitted by transmit machine 1142 onto line 1144 of the associated Ethernet domain.

For BREP chip 1102, each of the other Ethernet ports 1113, 1114, and 1115 have internal transmit FIFO buffers and internal FIFO receive buffers, and function as described for port 1112.

The transmit machine 1144 and receive machines 1134, and their counterparts (not shown) implement the Medium Access Control (MAC) function for their respective ports.

Figure 12:
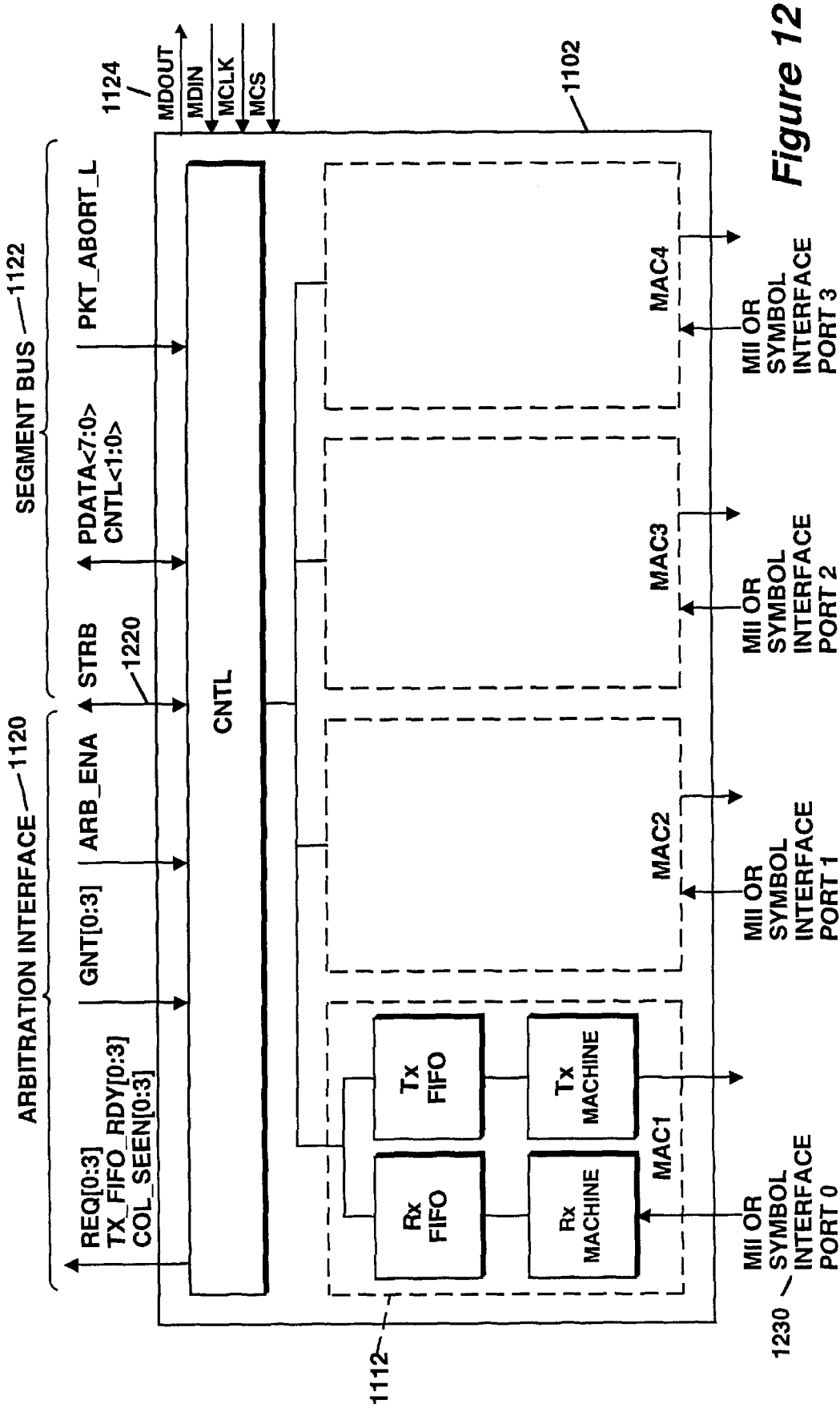
FIG. 12 is a block diagram of a BREP chip.

Turning now to FIG. 12, there is shown a block diagram of the internal structure of a BREP chip 1102. FIG. 12 gives, in addition to the structures shown in FIG. 11, signal designations of the signals brought into BREP chip 1102. Segment bus 1122 brings in the lines: strobe STRB 1220 signal; the eight bit data pathway PDATA<7:0>; the four line control CNTL<3:0> pathways; and the packet abort signal PKT_ABORT_L lines.

The Arbitration Interface 1120 brings in the lines: four request lines REQ[0:3]; four transmit FIFO ready lines TX_FIFO_RDY[0:3]; four collision seen lines COL_SEEN[0:3]; the four grant lines GNT[0:3]; and the arbitration enabled line ARB_ENA.

The Management Interface 1124 brings in the lines: MDOUT; MDIN; MCLX; and MCS.

Port 1112, with its Receive FIFO and Receive Machine, and with its Transmit FIFO and its Transmit Machine, is shown as alternatively, for example, implementing the standard interfaces 1230. For example, the interfaces implemented may include the Medium Independent Interface (MII) for use with, for example, 10 mega-bit per second Ethernet or with 100 mega-bit per second Ethernet. Alternatively, for example, the port 1112 may implement a Symbol interface for 100 mega-bit per second Ethernet.

As shown above with reference to FIG. 11, each port of the BREP chip 1102 implements standard MAC functions for the port's Ethernet collision domain.

The following tables, Table 1, Table 2, Table 3, and Table 4 give a description of the signals used in an implementation of the invention. The column marked # gives the number of signal pins used in the chip.

TABLE 1

Parallel interface pins

| signal name | I/O | description | # |
|---|---|---|---|
| REQ[3:0] | O | Port[i] request signal to an external arbiter. Asserted when RX FIFO[i] indicates that a packet is received from the media. Tri-State signal, driven when ARB_ENA is asserted | 4 |
| GNT[3:0] | I | Input from an external arbiter, granting port[i] the bus ownership to broadcast a received packet | 4 |
| TX_FIFO_RDY[3:0] | O | Asserted by port[i] when it is able to load a new packet from the data bus. Tri-State signal, driven when ARB_ENA is asserted | 4 |
| COL_SEEN[3:0] | O | Asserted by port[i] when a collision is detected during port's[i] transmission attempt, while port's REQ line is not asserted.. Cleared when the port[i] asserts its REQ[i] signal. Tri-State signal, driven when ARB_ENA is asserted. | 4 |

TABLE 1-continued

Parallel interface pins

| signal name | I/O | description | # |
|---|---|---|---|
| ARB_ENA | I | BREP-Arbiter enable signal When asserted, the BREP drives REQ[3:0], TX_FIFO_RDY[3:0]. When deasserted, REQ[3:0] and TX_FIFO_RDY[3:0] are tri-stated. | 1 |
| PDATA[3:0]<7:0> | I/O | Data bus. Data is transferred on this bus at 100 Mbps (12.5 MHZ).<br>Used for packet broadcasts, including starting/ending packet delimiter information.<br>The PData bus is shared among all BREPs. When it is not driven, the pattern appears on the PDATA bus is 10101010 | 32 |
| CNTL[3:0]<1:0> | | Control lines. Determine the cycle and meaning of the data which appears on the data lines according to the following encoding:<br>CNTL<1:0> PDATA<7:0><br><br>11 Idle mode<br>A preamble pattern is transmitted on the data lines as default.<br>01 Starting delimiter<br>In parallel, the granted port drives preamble and SFD patterns onto PDATA<7:0>.<br>00 Data valid<br>The data packet is driven on the data bus by the broadcasting port<br>10 Ending Delimiter<br>When the data packet transfer is completed, the granted port drives the following data:<br>chip_id, port_id, receive status<br>The CNTL lines are common to all the connected BREPs and the arbiter. When not driven, the CNTL lines are pulled up to (Idle). | 8 |
| PKT_ABORT_L[3:0] | I/O | Packet abort bit<br>Enabled only when enable_packet_abort control bit is set (OPM[i]16>)<br>Determines if the current loaded packet should be aborted before transmission. When working in internal address filtering mode, it is shared among all ports segments. When not driven it is pulled up.<br>When working with external CAM, it is used as input only, driven by the CAM logic. | 4 |
| STRB[3:0] | I/O | STRB signal is 12.5 MHZ clock sourced by the granted port. It is synchronized to the PDATA bus. All other BREP devices shall use this signal to sample the PDATA and CNTL buses.<br>Shared among all BREP devices, Arbiter and management unit.<br>When the DATA bus is in Idle state, the STRB signal is pull-down to '0' | 4 |
| CLK | I | 25 MHZ external clock. All BREPs, arbiter and external management unit uses this clock | 1 |
| Sub-Total | | | 66 |

End of Table 1

TABLE 2

Management interface

| signal name | I/O | description | # |
|---|---|---|---|
| MDIN | I | Management Data In - Serial input for management command/data<br>The MDIN signal is common for all connected BREPs. | 1 |
| MDOUT | O | Management Data Out - Serial output for management data output<br>The MDOUT signal is common for all the connected BREPs.<br>When not driven, it is pulled up to '1'. | 1 |
| MCS | I | Management Chip Select | 1 |
| MCLX | I | Management clock. The clock range is between 0 to 12.5 MHZ. | 1 |
| Sub-total | | | 4 |

End of Table 2

TABLE 3

PHY Interface

| signal name | I/O | description | # |
|---|---|---|---|
| MDIO[3:0] | I/O | Management Data Input Output, It is used to transfer control and status information between the PHY and the BREP | 4 |
| MDC[3:0] | O | Management Data Clock - Used as timing reference for management information transfer on the MDIO signal | 4 |
| MII_CS_RXD/SYM_RXD[3:0]<3:0> | I | Receive Data; Are driven by the PHY[i], synchronous with MII_CS_RCLK[i} | 16 |
| MII_DV[3:0]/LINK_ACTIVITY[3:0] | I/O | In MII mode: Input pin - Receive Data Valid; Driven by the PHY[i}<br>In PCS mode: Output pin - A status pin that provides a LED that indicates either receive, or transmit activity. | 4 |
| MII_CS_RCLK/SYM_RCLK[3:0] | I | Receive Clock; Provides the timing reference for the transfer of MII_DV[i], MII_CS_RXD[i] and MII_CS_ERR[i] signals | 4 |
| MII_CS_ERR[3:0] | | Receive Error; Is driven by the PHY[i]; Indicating that an error has occurred | 4 |
| MII_TX_ERR[3:0] | O | RESERVED at this stage of the design. Transmit Coding Error, | 4 |
| MII_CS_TCLK/SYM_TCLK[3:0] | I | Transmit Clock - Provides the timing reference for the MII_TXEN[i], MII_CS_TXD[i], and TX_ERR[i] signals | 4 |
| MII_TXEN/SYM_TXD<br><4>[3:0] | I | Receive Error, Is driven by the PHY[i]; Indicating that an error has occurred | 4 |
| MII_TX_ER[3:0] | O | RESERVED at this stage of the design. Transmit Coding Error. | 4 |
| MII_CS_TCLK/SYM_TCLK [3:0] | I | Transmit Clock - Provides the timing reference for the MII_TXEN[i], MII_CS_TXD[i]; and TX_ER[i] signals | 4 |
| MII_TXEN/SYM_TXD<4> [3:0] | O | In MII mode: Indicates that nibbles on the MII are presented for transmission.<br>In PCS Mode: Transmit data together with the four transmit lines MII\SYM_TXD<3:0> provide five parallel lines of data in symbol form. This data is synchronized to the MII/SYM_TCLK signal. | 4 |
| MII_CS_TXD/SYM_RXD<4>[3:0] | O | 4 data signals | 16 |
| MII_CLSN/SYM_RXD <4>[3:0] | I | In MII mode: Collision Detected.<br>In PCS mode: Receive data, together with MIL/SYM_RXD<3:0> provide five parallel lines of data in symbol form. This data should be synchronized to the MII/SYM_RCLK | 4 |
| MII_CRS/SD[3:0] | I | In MII mode: Carrier Sense - Asserted by the PHY when either the transmit or receive medium is non-idle.<br>In PCS mode: Signal Detect indication, supplied by the PHY device. | 4 |
| LINK_FAILED[3:0] | I | In MII mode: input pin - - Asserted by the PHY device, when Link Fail condition occurs<br>in PCS mode: Output pin - A status pin that provides a LED that indicates a signal detection activity and that the ports scrambler has been locked.<br>When this pin is not supported by the PHY device, it should connect to VSS. | 4 |
| Sub-total | | | 76 |

End of Table 3

TABLE 4

Miscellaneous Signals

| signal name | I/O | description | # |
|---|---|---|---|
| TMS | I | JTAG Test Mode Select | 1 |
| TCLKL | I | Test Clock | 1 |
| TDI | I | Test Data In | 1 |
| TDO | O | Test Data Out | 1 |
| RST | I | Switched Repeater Reset pin | 1 |
| GEP<3:0> | I/O | General Purpose Pins | |
| PSE<34:0>/<br>ISOL<3:0> | O | In Engineering mode: Post Silicon Event pins. Used for engineering purposes. Under this mode, those pins provide indications about the port's packet events and mode of operation.<br>In monitoring mode (default): Port isolation indicators<br>When set, indicates that the appropriate port is isolated.<br>(Either partitioning, Jabber, False carrier isolation, or isolation during node identification process).<br>PSE<0> = '1' indicates Port 0 is isolated<br>PSE<1> = '1' indicates Port 1 is isolated<br>PSE<2> = '1' indicates Port 2 is isolated<br>PSE<3> = '1' indicates Port 3 is isolated<br>The mode of operation is controlled by MTC <6> CSR. | 4 |

TABLE 4-continued

Miscellaneous Signals

| signal name | I/O description | # |
|---|---|---|
| PSE<4> | O Post Silicon Event pin <4>. Used for engineering purposes. | 5 |
| Sub-total | | 14 |

End of Table 4
TOTAL Signals, Tables 1–4 160
BREP Functional Description
Receiving a packet Each of the four BREP MACs comprises a 4 KB Rx FIFO. A BREP port is able to receive a new packet, when one of the following conditions are met: At least 1664 bytes are free; or the remote sender uses the BREP's flow control scheme and has enough credits to send a new packet.

The BREP port filters incoming packets that are shorter then 6 bytes. As soon as the received packet either reaches a threshold of 18 bytes, or reception has been completed, the port will request the opportunity to start broadcasting this packet, when polled by the arbiter.

In store & forward operation, the BREP port will request the opportunity to start broadcasting a packet after a complete packet has entirely been received.

In case the BREP port is unable to use the BREP's flow control scheme and none of the above conditions are met, and the BREP cannot receive an additional packet, the BREP port enters the backpressure mode, described hereinbelow.

The BREP port receives and broadcasts legal packets, corrupted packets, runt packets and short packet events generated by end-station or repeated by 802.3 100 Mbps repeater connected to its port.

The BREP port only broadcasts runt frames generated by other devices transmission collision. It does not transfer runt frames generated when it tried to transmit and suffered a collision.

Upon detection of a packet longer than 1600 bytes, the receiving port flushes the remaining bytes and terminates the packet with a 'packet-long' indication.

Transmitting a packet

Each of the four BREP MACs comprises a 2 KB Transmit FIFO. Loaded runt packets with length smaller then 11 bytes are filtered and are not transmitted to the remote node.

Whenever a TX FIFO has loaded at least 16 bytes of packet's data and no PKT_ABORT_L signal deassertion has been detected, or ending packet detected, the BREP MAC will attempt to transmit the packet via the MII port as described in section hereinbelow. BREP port[i] indicates its ability to load a new packet by asserting TX_FIFO_RDY [i].

A BREP port is able to load a new packet in store & forward operation or in cut-through operation if at least 1664 bytes are free. In cut-though operation the port can load a packet if the loaded packet is being transmitted and has passed the collision window (64 Bytes were already transmitted without incurring a collision).

A special (programmable) back off limit is used whenever the BREP port's RX FIFO is not full, instead of, for example, the standard Fast Ethernet protocol back off limit.

When a late collision event occurred while transmitting a packet, the packet is aborted, and the event is reported in the BREP status register.

Maximum loaded packet length should not exceed a length of 1600 bytes. Loading a packet with length greater then 1600 bytes may lead to unpredictable results.
Broadcasting a packet Whenever a port is granted the opportunity to broadcast a received packet, it starts the broadcasting operation. It first drives the Start Frame code on the CNTL[i]<1:0> lines for two cycles, while a preamble octet and an SFD are placed on the PDATA bus. Then, it transfers the stored received data on the PDATA[i]<7:0> lines, while driving the Data Valid code on the CNTL[i]<I:O> lines. After the last data byte is transferred, the broadcasting port drives the chip_id, port id, receive_packet_status and receive_packet_length on the PDATA[i]<7:0> lines, while driving the End_Frame code on the CNTL<1:O> lines.

In addition, the granted port drives its 12.5 MHZ clock on the STPB[i] line for the whole data transfer duration. The destination ports latch the PDATA and CNTL lines at the assertion of STRB. The other ports' transmit FIFOs load the broadcasted packet, and will later transmit them as described hereinabove. The PDATA, CNTL and STRB lines are propagated outside the BREP chip, such that packets can be broadcast both "from" and "to" other BREP chips.

Following is a summary of a broadcasted packet format:

| CNTL<1:0> | PDATA<7:0> |
|---|---|
| Start-Frame | Preamble Octet |
| Start-Frame | SFD |
| Data Valid | Data |
| . | . |
| . | . |
| . | . |
| End-Frame | chip_id, port_id |
| End-Frame | receive_packet_status & receive_packet-length |

Address Filtering
First, Internal Address Filtering is described.

In order to improve the overall system performance, a BREP port is able to filter out packets broadcast on a segment bus. Another BREP port having the packet destination address on its Ethernet LAN, and sharing the same segment bus, detects the packet and forwards the packet onto its Ethernet LAN, and so to its remote node.

If the internal address filtering mechanism is enabled, the BREP port uses a simple learning process in order to detect if it is connected to one or more remote end-stations, and to determine if the remote node connection is still valid.

The BREP port stores the last valid source address received from its remote node in a register: uni_address_register.

While the source address stored in uni_address_register is still valid, the BREP port compares the broadcasted packet destination address field to the addresses which it stores. If the broadcasted packet address matches a stored address, the BREP port notifies other BREP ports sharing the same segment to abort the currently broadcasted packet by pulling down the PKT_ABORT_L signal.

Other BREP ports, when they detect deassertion of PKT_ABORT_L signal during the first 16 byte time since the packet broadcast started, aborts the currently loaded packet until end of packet notification is detected. The broadcasted packet is not transmitted to any other remote end-stations by a BREP port detecting the PKT_ABORT_L signal.

If PKT_ABORT_L deassertion is detected after the first 16 byte times, the port shall not abort the currently loaded packet and it will be transmitted.

Broadcast and Multicast packets are always forward to remote end nodes, unless PKT_ABORT_L signal deassertion is detected.

This internal address filtering mechanism is implemented by each port using a Valid_bit (V_bit) and Flood_bit (F_bit). Filtering packets is based upon the status of these bits.

Table 5 gives the values of the V-bit and the F-bit, and the action which the values lead to:

TABLE 5 port behavior under various V_bit and F_bit modes

| V-bit | F-bit | Port's Operation |
|---|---|---|
| 0 | 1 | Filters only currently loaded packet whenever PKTABORT_L signal is detected low within the first 16 byte time since packet was first loaded. |
| 1 | 1 | Filters only currently loaded packet whenever PKT_ABORT_L signal is detected low within the first 16 byte time since packet was first loaded. Deassert PKT_ABORT_L signal whenever the stored destination address field matches the port's uni_address_register value |
| 1 | 1 | Deassert PKT_ABORT_L signal whenever stored destination address field matches the uni_address_register value. Filter currently loaded packet whenever stored destination address field does not match the uni_address_register value. |

Valid bit functionality

In order to verify that the source address stored in its uni_address_register is still valid, each BREP port maintains T1 timer and Valid-bit (V-bit).

Whenever a valid packet (Ethernet or 802.3 packet with valid length and correct FCS field) is received, T1 timer is set, V-bit is set and uni_address register stores the packet's source address field. While V-bit is set, if broadcasted packet destination address matches the port's uni_address_register, the port shall pull down the PKT_ABORT_L pin.

The V-bit assertion and deassertion rules are summarized in Table 6 below:

TABLE 6 giving V_bit functionality

| current State | Next State | Conditions for Transition | Operation executed while entering the new state |
|---|---|---|---|
| X | 1 | Valid address received | Set T1 timer<br>V_bit = 1<br>uni_address_register = received source address<br>if(uni_address_register != received valid source address)<br>Set T2 timer |
| 1 | 0 | T1 timer expired OR port initialized | V_bit = 0 |

Flood bit functionality

Each BREP port needs to identify if it is connected to a single end station or to multiple number of end stations. Each port maintains in addition to the Valid_bit, T2 timer and Flood_bit (F_bit). The F_bit assertion and deassertion rules are summarized in Table 7 below.

TABLE 7

Flood Bit, or F_bit, functionality.

| Current State | Next State | Condition for Transition | Operation executed while entering the new state |
|---|---|---|---|
| X | 1 | (uni_address_register != valid received source address) OR T1 timer expired OR port initialized | F_bit = 1 |
| 1 | 0 | T2 timer expired AND valid_packet_received | f_bit = 0 |

Where: valid_packet_received = Ethernet or 802.3 packet with valid length and correct FCS.

Figure 13:
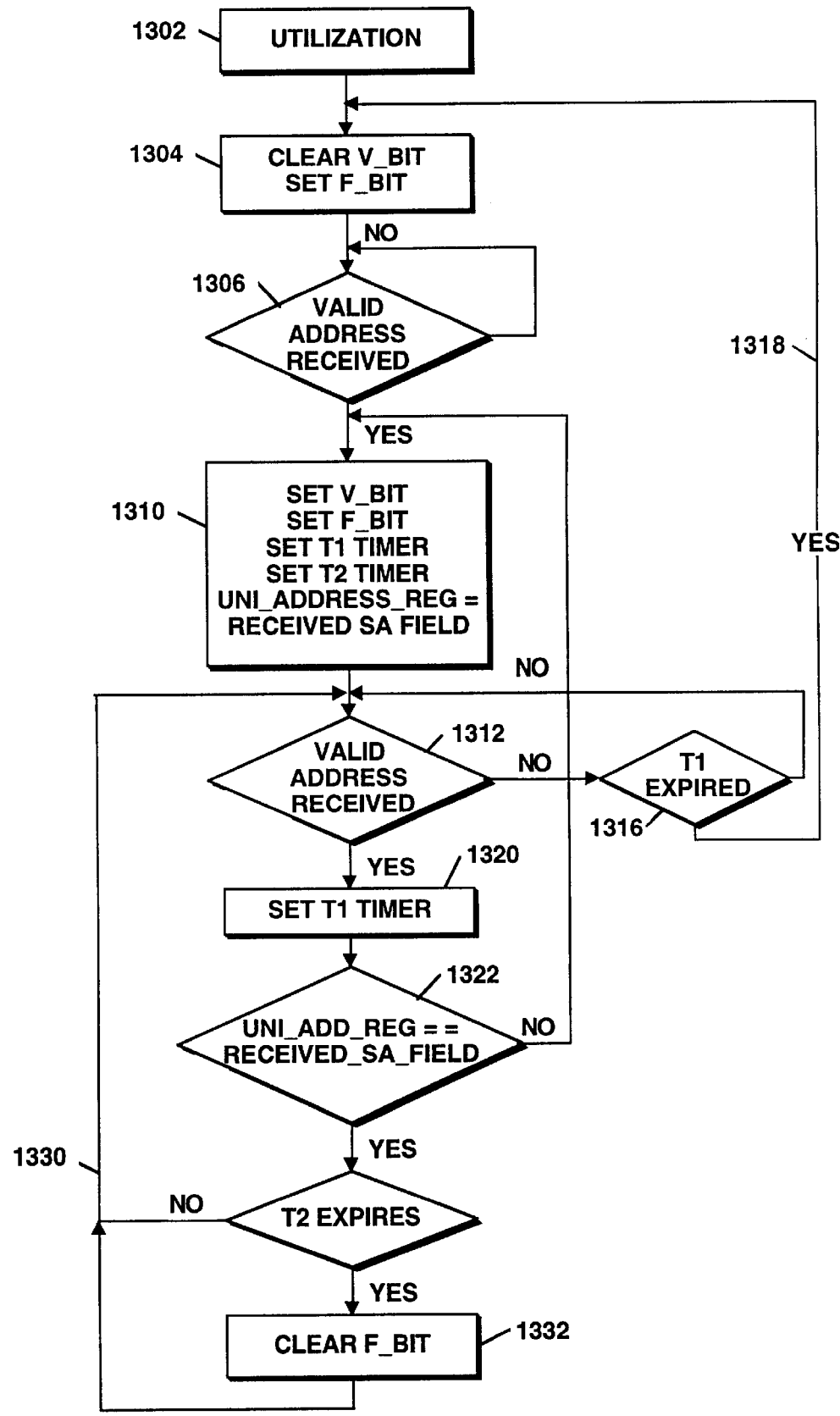
FIG. 13 is a flow chart for internal address filtering.

Turning now to FIG. 13, there is shown a flow chart for setting the valid bit V_bit, the flood bit F_bit, the timer T1, and timer T2. At block 1302 the system is initialized. At block 1304 the V_bit is cleared and the F_bit is set. In the event that a valid address is detected on a packet received from the Ethernet local area network connected to the port, the system goes to block 1310. At block 1310 the V_bit is set, the F_bit is set, the timer T! Is set, the timer T2 is set, and the uni_address_reg register is loaded with the source address of the packet received from the Ethernet local area network connected to the port.

The system then goes to block 1312 where it waits for receipt of another valid packet from the Ethernet local area network connected to the port. At block 1312 the system checks for receipt of a valid packet and at block 1316 tests timer T1 for expiration. In the event that the timer has not expired, the system returns to block 1312 to continue checking for receipt of a valid packet. In the event that timer T1 has expired, the system returns along path 1318 to block 1304. Expiration of timer T1 means that the address stored in register uni_address_reg at block 1310 has expired. Upon detection of a valid packet at block 1312, the system goes to block 1320.

At block 1320 timer T1 is set, and the system goes to block 1322. At block 1322 the source address field of the packet detected at block 1312 is compared with the contents of register uni_address_reg, that is with the source address of the packet received at block 1306. In the event that the addresses match, the system goes to block 1324 where the expiration of timer T2 is checked. In the event that T2 has expired, the system returns along path 1330 to block 1312. In the event that T2 has not expired, the system goes to block 1332. At block 1332 the F bit F_bit is cleared. The system then returns along path 1330 to block 1312.

Operation of the system illustrated in FIG. 13 is as follows: the F_bit can be set to "0" in order to indicate that the port is connected only to one station, but the F_bit can only be set to "0" if the address stored in register uni_address_reg is still valid as determined by timer T1, as indicated by the value of the valid bit V_bit being equal to 1. When the stored remote node address stored in the register uni_address reg is not valid, the value of V_bit is "0" the value of F_bit is set to "1" at block 1304.

Port notification in the filtering action follows as: the V_bit defines if the address stored in the uni_address_ register is valid; if the address is not valid (i.e V_bit=0), the port will not notify other ports sharing the same segment bus to filter out packets when there is a match between the packet's destination address and the port's stored source address. In this mode the value of F_bit is set to "1", meaning the port is assumed to be connected to more than one end-station.

When the V_bit is set (V_bit=1), meaning the stored remote node's source address is still valid, the port tries to identify if it is connected to one or more end-stations (through a repeater or buffered repeater). The port sets F_bit to "0" when it detects that it is connected only to one station, otherwise the value of F_bit remains "1". When the F_bit is set to "0" in order to indicate that the port is connected to only one station, then the value of the V_bit must be at "1" to indicate that the stored address of the one station is still valid and has not expired by expiration timer T1.

Any port having its F_bit set to "0" then pulls down the line PKT_ABORT_L when it detects a packet broadcast on the segment bus that has a destination address equal to the address stored in the port's register uni_address_reg, thereby notifying the other ports that they need not transmit the packet from the segment bus onto their Ethernet local area networks. The port having its F_bit set to "0" is the only port having the destination station attached to its Ethernet local area network.

External Address Filtering Capability

Figure 14:
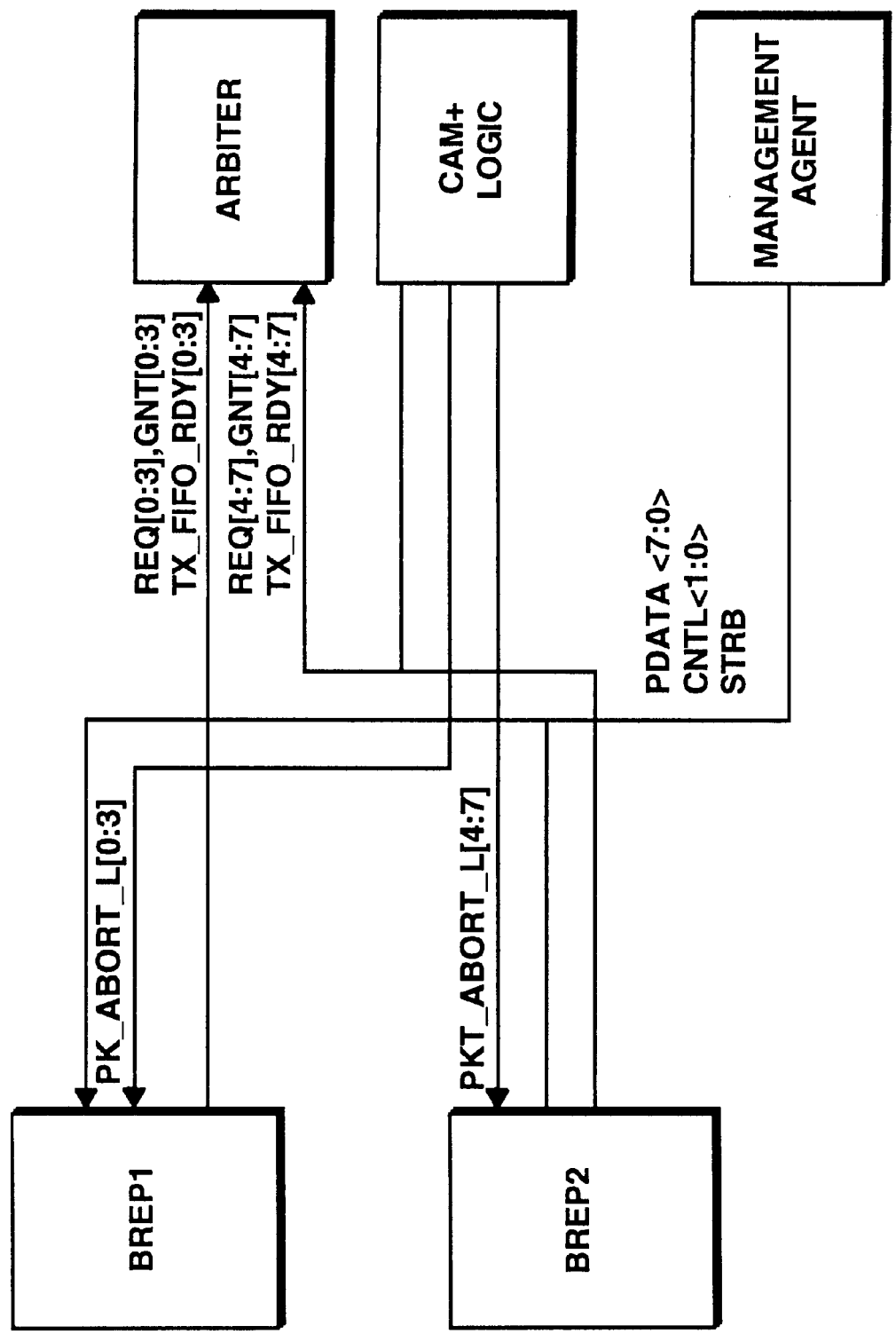
FIG. 14 a block diagram for connection of an external CAM to a system using BREP chips for the purpose of address filtering.

Turning now to FIG. 14, a block diagram of operation with an external Content Addressable Memory, CAM, for address filtering is shown. The BREP based system enables the user to attach external CAM logic in order to further enhance the system performance. When working with external CAM, the internal address filtering mode control bit is disabled (clear_v_bit is set OPM[i]<23>) and external CAM mode control bit is enabled. In this mode, PKT_ABORT_L[i] is an output from the external CAM logic to each of the BREP segment ports.

The CAM, after initialized by the management agent, detects the destination address field while the packet is being broadcasted onto a segment bus and compares it to its CAM content table. If HIT is detected, the CAM logic deasserts all the PKT_ABORT_L[i] signals to ports which the broadcasted packet is not target to. If MISS is detected, PKT_ABORT_L[i] signals remain asserted, thus all ports will transmit the broadcasted packet.

The BREP's management agent performs: learning; address table management operations like addition and removal of addresses; and, aging.

Backpressure

Backpressure algorithm

When less then 1664 byte transfer of RX_FIFO are free and the remote node is unable to use the BREP's flow control data transfer scheme, the BREP port enters backpressure mode.

The backpressure idea is to deliberately generate a carrier activity on the physical link in order to delay additional Rx packets.

The BREP implements two different algorithms for backpressuring the physical link.
1. BP using special BP packet
2. Colliding on every received packet
The two BP modes are exclusive.

If the first mode is enabled, if a BREP port has a TX packet or part of it loaded in the TX FIFO, this packet is used for backpressuring. Otherwise, if the TX FIFO is empty, the BREP generates a special BP packet, whose format is detailed in section 4.5.2 and uses this packet for backpressuring.

If a collision happens while the BREP port backpressures, the BREP port defers, waits for the minimal IPG (0.96 μsec) and retries transmission. However, during the whole backpressure process, the BREP port maintains a backoff limit of 0. This ensures that the remote node delays the successful transmission it is trying to achieve.

While a port is transmitting BP packets, a TX packet may be loaded into the port. In this case, the port should start backpressuring with this TX packet instead of a BP packet as soon as possible. The port therefore strips the currently transmitted BP packet (but not less than 64 bytes), and appends a valid CRC. The BREP port then continues backpressuring with the loaded TX packet.

After this packet has been transmitted, the BREP port will resume backpressuring with BP packets, unless an additional packet is ready for transmission.

When the BREP port exits the backpressure mode, it resumes nominal backoff. The only digression from the Ethernet algorithm is that the maximum backoff limit is a programmable value instead of 10. If the BREP port exits backpressure mode while transmitting a BP packet, it stops the BP packet transmission as soon as possible (packet length>=64 Bytes), closes it with a good CRC, and resumes normal operation.

The following Table 8 and Table 9 detail the BREP behaviors, depending on the FIFOs status

TABLE 8 backpressure behavior using special backpressure packets.

| Local BREP Rx FIFO | Local BREP Tx FIFO | Behavior Description |
| --- | --- | --- |
| Full | Empty | Local BREP backpressures remote node with BP packets. backoff_limit = 0 |
| Empty | Full | Local BREP transmits the loaded packet according to binary exponential backoff rules. |
| Full | Full | Local BREP transmits the loaded packet with backoff_limit = 0 |

The following Table 9 summarizes the BREP port behavior if the second BP mode (colliding on every received packet) is enabled.

TABLE 9

Port behavior under the condition of collide on every receive packet back pressure mode.

| Current State | Next State | Conditon for Transition | Operation Executed while Entering New State |
| --- | --- | --- | --- |
| IDLE | 1 | BP_Mode AND (TX_FIFO is empty) AND (packet is being received) | Collide with incoming packet by transmitting a JAM pattern of 96 bit length |
| IDLE | 2 | BP_Mode AND (TX_FIFO is not empty) | Transmits loaded packet with backoff limit = 0 |
| 1 | IDLE | Transmission of JAM pattern completed | |
| 2 | IDLE | Complete loaded packet transmission | |

BP packet format
  Destination Address=Programmable value (As programmed in DAl[I], DA2[i] registers)
  Source Address=My_Source_Address (As programmed in SA1[I]. SA2[i] registers
  Type=BP (Programmable value)
  64<Length<1518 bytes
BP packet filtering
  BP packets contain no real information. They are used only to keep the media busy. Therefore, a BREP port receiving such packets from a remote BREP port filters them out, and does not broadcast them to its peer ports. The packet filtering is done based on the BP packet type field.
Flow Control
  In order to improve the overall system performance, a BREP port uses a unique flow control mechanism whenever its remote node is able to use the same flow control.
  The BREP's flow control scheme is a "credit based" scheme. Credits are sent in a special legal 64 byte flow control packet. Flow control packets are exchanged between two flow control capable devices configured in Point-to-Point link.. These packets contain credit information reflecting the available buffer space in bytes at the receiver's FIFO. Upon receiving a new legal credit packet from the remote node, the local receiver extracts the credit information, and updates the transmitting machine credit count.

The sender keeps the remote receiver credit value in its "byte count" counter. The sender is allowed to transmit a new packet when either:
  Its byte -count value is greater then 1608 bytes; or,
  It stores a complete packet with total length less then its byte_count value.

The sender decrements its Byte_Count for every byte it sends. The sender updates its byte count when a valid credit packet is received from the remote node. A valid credit packet is a packet which format is described below in the section "Flow Control Packet Format", with a correct FCS.

The receiver traces the remote sender Byte_Count in order to determine when to generate and transmit a new credit packet. In order to track the remote sender Byte_Count, the receiver holds two counters:
  Actual RX_FIFO_size counter: reflects the actual available receive FIFO. It is decremented for every byte received, and incremented for every byte taken out;
  Value_sent counter: traces the remote sender byte_count. The value_sent counter is loaded with the updated (RX_FIFO_size counter—FCTL_Delay) value which is the credit information sent to the remote transmitter, and it is decremented for each byte received and stored in the RX-FIFO.

Where FCTL-Delay takes into account the following delays:
  Round trip delay;
  Flow control packet transmission delay (flow control packet length);
  Sender and remote receiver processing time; and,
  Internal margin taken due to RX-FIFO operation.

The receiver generates new credit packets in the following cases:
  (value_sent counter<1664 bytes) AND (( FIFO_size counter—FCTL_Delay)>3K bytes, or a 0.335 second has passed since the last credit packet was transmitted, or during identification process as described below in the section "Remote Node Flow Control Identification".

The generated credit packet has priority in transmission over loaded TX packets.

In addition, the receiver while working in full duplex flow control, FDX FCTL, mode sends credit packets when its TX_FIFO is empty or unable to send its loaded packets and (FIFO_size counter—FCTL_DELAY)>value_sent counter.

When the BREP port receives a flow control packet from a remote node, it extracts its credit information. The BREP port then filters out these packets and does not broadcast them onto the segment bus to its peer ports.

Figure 15:
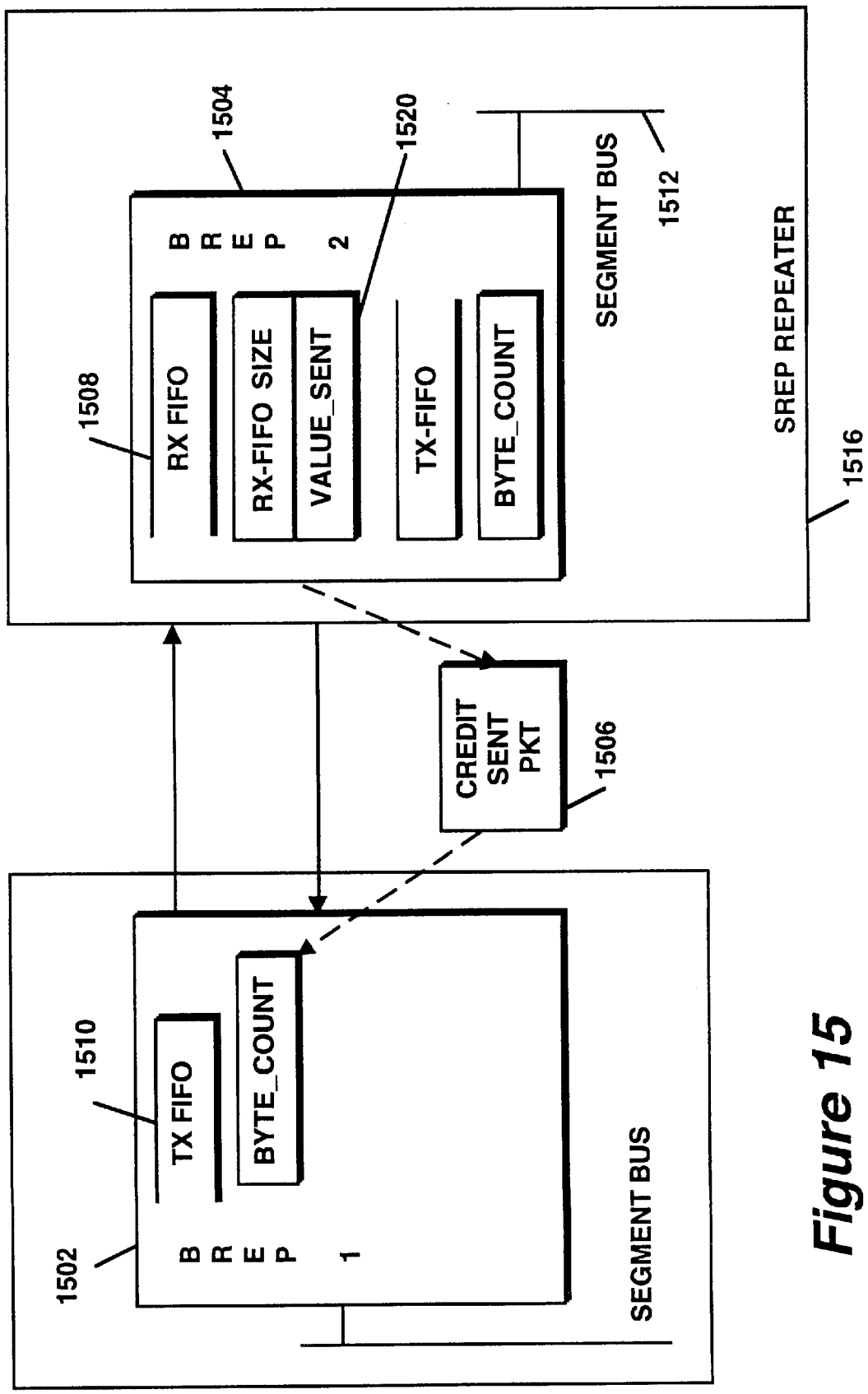
FIG. 15 is a block diagram showing flow control counters.

Turning now to FIG. 15, there are illustrated the relationships between the flow control counters. BREP port 1 1502 transmits packets to BREP port 2 1504 under the control of "flow control". BREP port 1 1502 may be in an end station, may be in a SREP repeater, or may be in any apparatus which has ports implementing the BREP port flow control protocol. Credits are sent in "flow control packet" 1506 from the receiving port 1504 to the transmitting port 1502 in order to limit the number of packets sent to the receiving port 1504. The receive FIFO 1508 of receiving port 1504, receives packets from the transmit FIFO 1510 of transmitting port 1502, and also the receive FIFO 1508 is drained by broadcast of the packets it receives onto the segment bus 1512 of the receiving SREP repeater 1516.

The value sent block 1520 keeps track of the size of the receive FIFO 1508, the number of bytes contained in receive FIFO 1508, the number of bytes authorized in previously sent credit packets 1506, and the number of bytes received from the transmit FIFO 1510 in order to determine when another "flow control packet" 1506 can be sent to the transmitting port 1502. When value sent block 1504 determines that another "flow control packet" 1506 can be sent with an authorization for transmit FIFO 1510 to send a determined number of bytes to receive FIFO 1508, then a "flow control packet" 1506 is sent from the receiving port 1504 to the transmitting port 1502. The determined number of bytes which can be sent by transmit FIFO 1510 is included in "flow control packet" 1506 in an information field, Credit-Value-Sent. The format of a "flow control packet" is given in the following table.

Flow Control Packet Format

| Destination Address | 6 bytes |
|---|---|
| Source Address | 6 bytes |
| Type | 1 word |
| OpCode | 1 word |
| Credit-Value Sent | 1 word |
| Padding | 42 bytes |
| FCS | 4 bytes |

The Flow Control Packet has a length of 64 bytes, and so the padding is set at 42 bytes to make up this packet length.

The fields of the flow control packet are defined as follows:

Destination Address=Programmable value

Source Address=My_Source_Address (Programmable value)

| Type: | Programmable value |
|---|---|
| OpCode: | Programmable value |
| Credit-Value-sent: | In bytes |

Remote Node Flow Control Identification

The Flow control initialization process is controlled by the management unit. The flow control auto detection idea is to check if the remote node is able to perform the BREP's flow control scheme.

The Media Independent Interface, MIE, is described in Standard 802.3u 1995, at section 22 and beginning at page 37.

The Media Independent Interface for 100 BASE-T4 standard, MII-T4, is discussed at Standard 802.3u 1995, at section 23 and beginning at page 81.

The Media Independent Interface for 100 BASE-TX standard, MII-TX, is discussed at Standard 802.3u 1995, at section 24 and beginning at page 157, and at section 25 beginning at page 193.

NWay capability of a port is defined in IEEE Standard 802.3u Chapter 28, beginning at page 235, as an auto-negotiation protocol. NWay functionality enables two nodes connected at both ends of a link (point-to-point connection) to exchange information between them and to execute an auto-configuration algorithm.

The BREP port requires from its PHY device the following capabilities:

MII TX PHY:
  NWay capabilities
  FDX, FCTL support
  Manageable through II interface.
MII T4 PHY:
  NWay capabilities;
  FCTL support
  Manageable through MII interface.
TX Symbol PHY:
  FDX support.

When the BREP port identifies that it is connected to a local Media Independent Interface physical interface, MII PHY, it tries to identify if its remote node is NWay capable, and its type either "TX" or "T4 PHY".

When the remote node is NWay supported, the management unit finds out, through the auto-configuration process, about the remote node FCTL capabilities. When the remote node reports that it is capable to perform FCTL, the management unit sets the BREP's mode of operation either to full duplex flow control FDX FCTL, or to half duplex flow control HDX FCTL. The management unit then instructs the BREP to perform flow control auto-detection.

If the remote node does not support the BREP's flow control scheme, the BREP port notifies the management unit and the BREP port halts its flow control initialization process.

When the management unit detects FCTL failure, the management unit re-establishes the link as half duplex, HDX, when the BREP port is initialized to work in BREP-client mode of operation (BREP uses the BP scheme).

Figure 16:
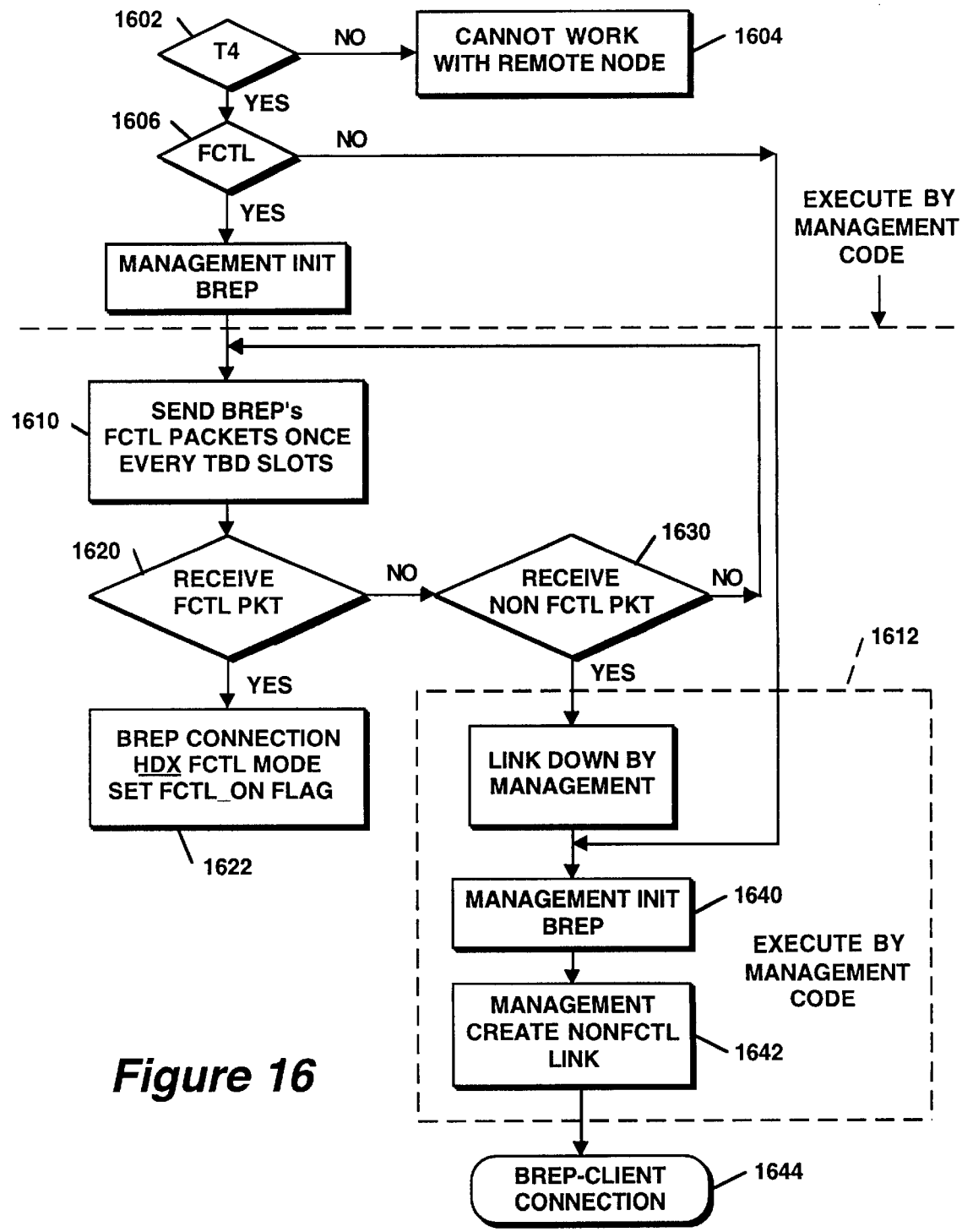
FIG. 16 is flow control diagram for establishing half duplex flow control for a link that is capable of running NWay auto-configuration.

Turning now to FIG. 16, there is shown a flow chart giving the steps required to identify the remote node capabilities, in the case that the local PHY device is MII T4 PHY. At block 1602 the management code in the BREP chip or the SREP repeater tests to determine if the remote port is a T4 port, and if not the system goes to block 1604 where the system indicates that it cannot work with the remote port.

In the event that the remote port is T4, then the system goes to block 1606. At block 1606 it is determined whether the port is requested to set up a flow control session. In the event that the answer is "yes", the system goes to block 1610. In the event that the answer is "no" the system goes to block 1612. Block 1612 is discussed further herein-below.

The functions of blocks 1602, 1604, and 1606 are operated by management code. The functions indicated in blocks 1610, 1620, 1622, 1630, and 1644 are operated by logic within the BREP chip.

At block 1610 the port periodically transmits flow control packets. The periodic transmission uses a convenient time period, indicated by TBD slots. At block 1620 the port tests in order to determine if it has received any BREP flow control packets. If the answer is "yes" that the port has received a BREP flow control packet, then the system goes to block 1622 where the port sets up a half duplex flow control session with the remote port. Also, at block 1622 the HDX_FCTL mode is entered, and the flag FCTL_On is set.

In the event that block 1620 does not detect a BREP chip flow control packet, the system goes to block 1630. At block

1630 the system tests whether or not a packet which is a not a BREP flow control packet was received. In the event that no non-flow control packet was received, the system returns to block 1610. In the event that a non-flow control packet was received, then the system goes to block 1612.

Functions within block 1612, indicated by dashed lines, are operated by management code. At block 1612 the system enters block 1640. At block 1640 the management code initializes the BREP port, and then the system goes to block 1642. At block 1642 the management unit establishes a session without flow control with the remote port. The system then goes to block 1644 where a BREP port session with a client port is established without flow control.

Figure 17:
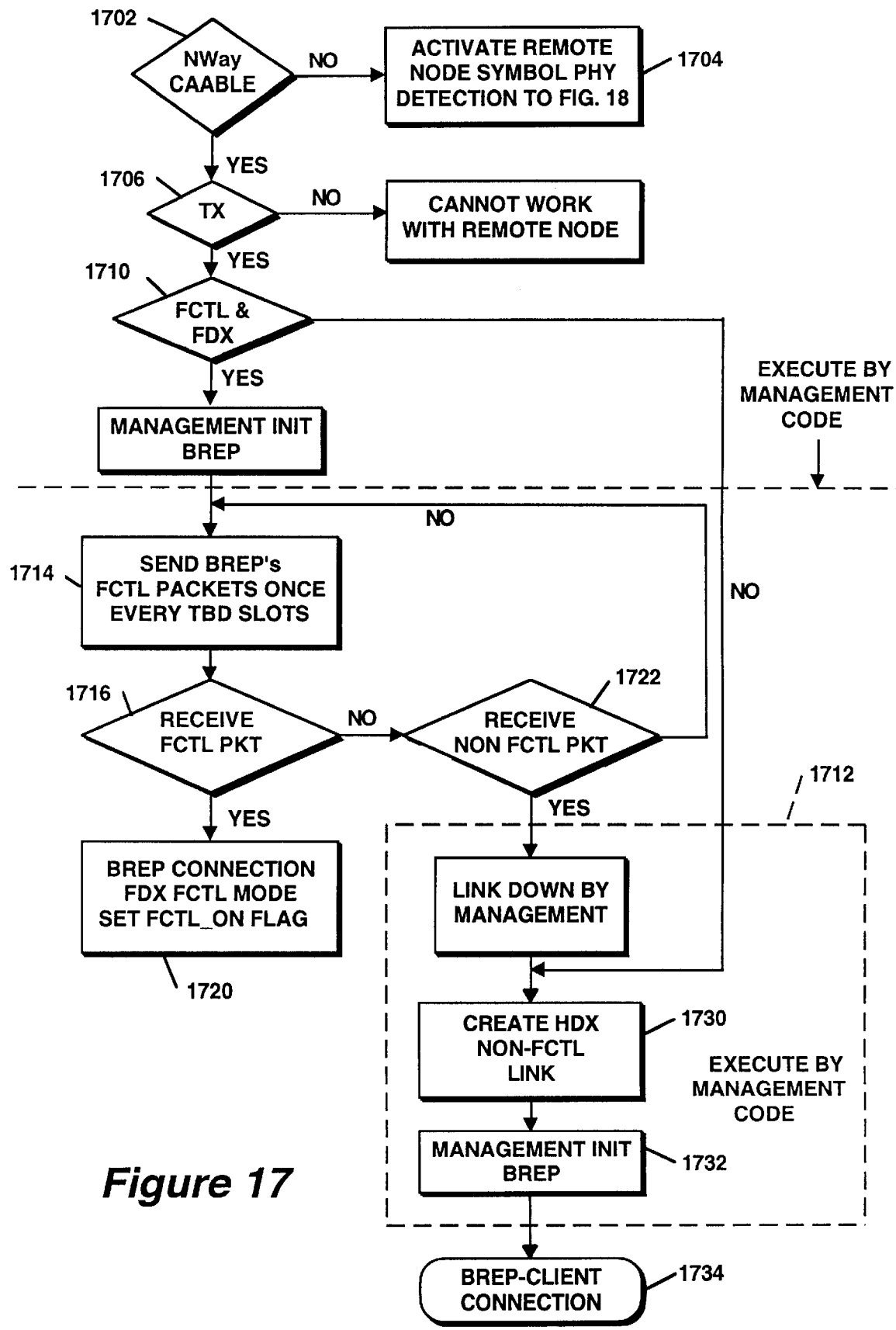
FIG. 17 is a flow control diagram for establishing full duplex flow control for a link that is capable of running NWay auto-configuration.

Turning now to FIG. 17, there is shown a flow chart giving the steps required to identify the remote port capabilities, in the case that the local PHY device is MII TX FDX PHY. At block 1702 the BREP chip port interrogates the remote port in order to determine if the remote port is NWay capable. In the event that the remote port is not NWay capable, the system goes to block 1704, where the system then goes to the process of FIG. 18. In the event that the remote port is NWay capable, then the system goes to block 1706.

The functions of blocks 1702, 1704, 1706, and 1710 are operated by management code. In contrast, the functions of blocks 1714, 1716, 1720, 1722, and 1734 are operated by logic in the BREP chip.

At block 1706 the remote port is interrogated in order to determine if it is TX capable. In the event that the remote port is not TX capable, then the system goes to block 1708 where it is determined that the remote node cannot work with the BREP chip port. In the event that block 1706 determines that the remote port is TX capable, the system goes to block 1710.

At block 1710 the BREP there is a determination as to whether it is desired to set up the port as a flow control (FCTL) session or as a full duplex (FDX) session. In the event that the answer is "no", the system goes to block 1712. Block 1712 will be further discussed hereinbelow.

In the event that block 1710 answers "yes" that flow control or full duplex is desired, then the system goes to block 1714. At block 1714 the BREP port periodically transmits flow control packets, indicated as FCTL packets. The periodicity is, a packet is transmitted every TBD time slots. After transmission of a packet, the system goes to block 1716.

At block 1716 the system tests in order to determine if a BREP port flow control packet has been received. In the event that a BREP chip flow control packet has been received, the system goes to block 1720.

At block 1720 the port sets up and enters a full duplex session with flow control. Also, the port enters the FDX FCTL_mode, and the FCTL_On flag is set.

In the event that block 1716 does not find that a flow control packet has been received, the system goes to block 1722. At block 1722 it is tested to determine whether or not a packet which is not a flow control packet has been received. In the event that no such non-flow control packet has been received, the system returns to block 1714. In the event that a non-flow control packet was in fact received, then the system goes to block 1712.

The functions of block 1712, which is indicated by dashed lines, are executed by management code. At block 1712 the system goes to block 1730. At block 1730 the system creates a half duplex link with the remote port, and without the use of flow control. From block 1730 the system goes to block 1732. At block 1732 the system initiates the port by management action. The system then goes to block 1734.

At block 1734 the BREP chip establishes a session with the remote port as a half duplex connection without flow control.

Figure 18:
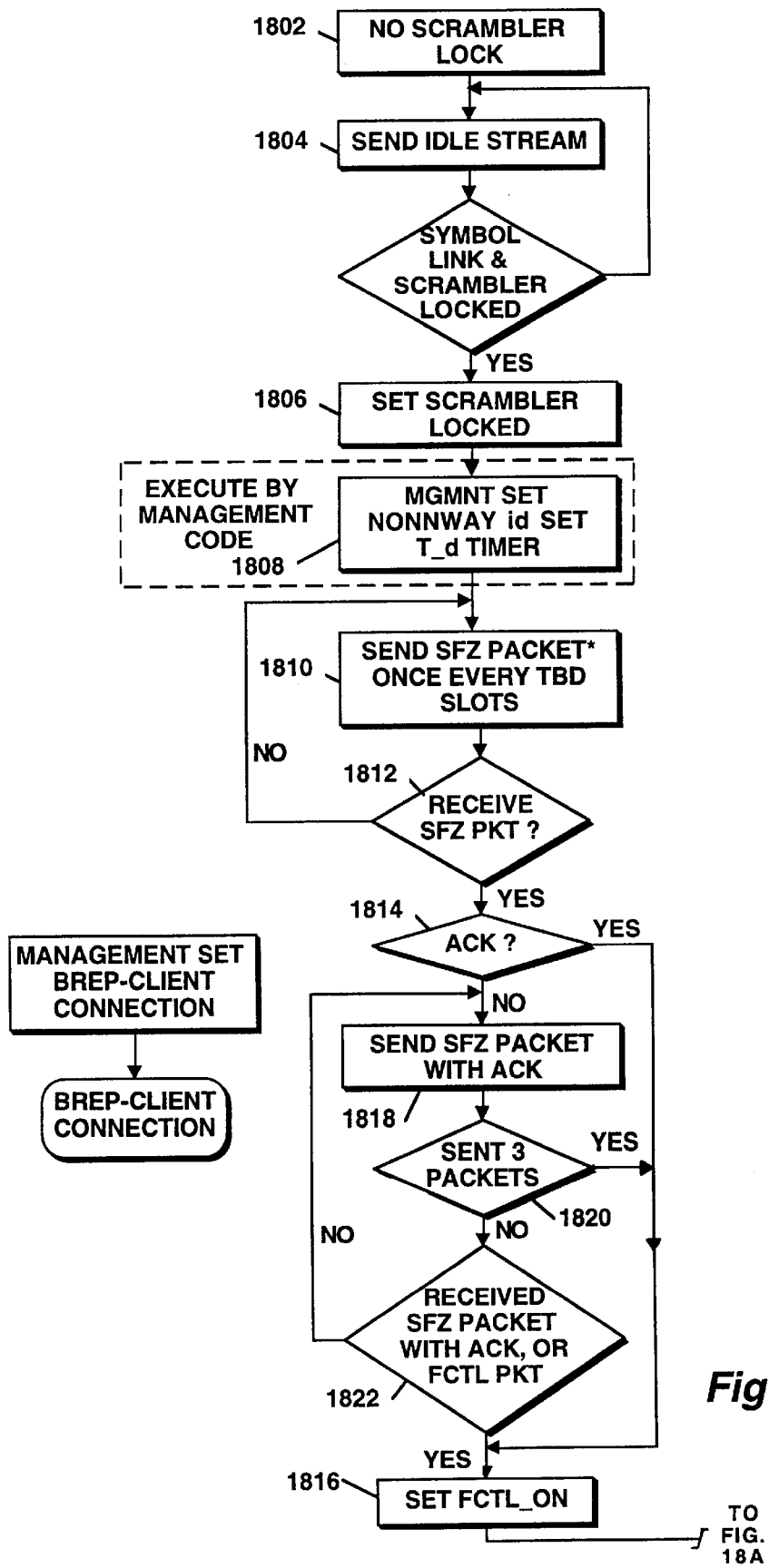
FIG. 18 is a flow control diagram for establishing full duplex flow control for a link that is not capable of running NWay auto-configuration.
Figure 18A:
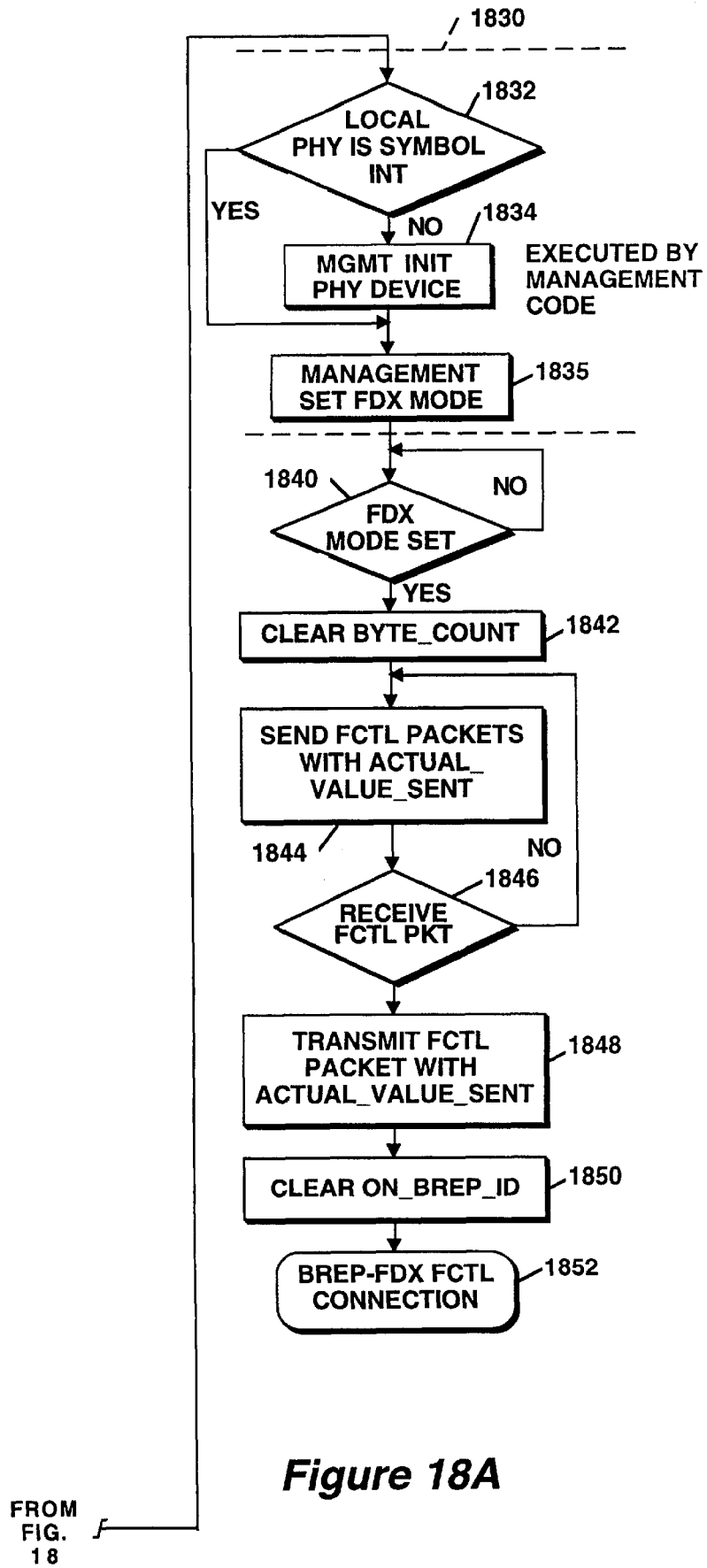

Turning now to FIG. 18, there is shown a flow chart giving the steps required to identify the remote node capabilities, in case the local PHY device is TX Symbol interface, or the remote node is not NWay capable.

In case the local PHY device has Symbol interface (TX FDX capable), or the remote node is not NWay capable, the BREP port sends flow control packets, preceded by seven bytes of Preamble pattern:

10101010 10101010 10101010 10101010 10101010 10101010 10101010 followed by an SFZ pattern. The SFZ pattern is a special Start Frame Delimiter with a final Zero pattern:

10101000.

The SFZ pattern indicates the start of detection of frames which are the BREP port's flow control packets.

When a BREP node receives a packet with an SFZ pattern from its remote node during link initialization process, the BREP node thereby determines that its remote node is FDX flow control capable and moves to FCTL FDX packet exchange protocol.

Turning again to FIG. 18, the BREP node begins initiation at block 1802. At block 1802, the mode is set to "no scrambler lock", and the system goes to block 1804. At block 1804 the BREP chip port sends an idle stream to the remote port. At block 1806 the port tests whether the symbol link and the scrambler are locked to an idle stream coming from the remote port, and in the event that they are the system moves to block 1806. In the event that the symbol link and the scrambler are not locked to an idle stream, the system returns to block 1804 and continues sending an idle stream.

At block 1806, the system sets "scrambler locked", and the system goes to block 1808.

At block 1808 the management code sets a non-NWay flag, and also sets a timer, the T_D timer. The system then goes to block 1810.

At block 1810 the system periodically sends a SFZ packet. The periodicity is to send a packet once every TBD time slots. From block 1810 the system goes to block 1812.

At block 1812 the system tests in order to determine if an SFZ packet has been received. In the event that no SFZ packet has been received, the system returns to block 1810 and sends an SFZ packet. In the event that an SFZ packet has been received, the system goes to block 1814.

Receiving a SFZ packet with an ACK indication by the local node means that the remote node has received and identified a SFZ packet. The local node then "knows" that its partner is a buffered repeater chip, a BREP chip. In case the credit value in the received ACK packet is not zero, the packet is treated as an SFZ packet with an ACK indication.

Alternatively, in case the credit value in the received SFZ packet is zero, the packet is treated as having no ACK indication. Receiving a SFZ packet with no ACK indication means that the remote node did not detect or receive a SFZ packet before transmitting the packet received by the local node.

At block 1814 the system tests in order to determine if an ACK acknowledgment packet has been received. In the event that an ACK packet has been received, the system goes to block 1816. At block 1816 a flag FCTL_On is set.

In the event that block 1814 answers "no" that no ACK has been received, the system goes to block 1818. At this point the local node has identified the remote node as a BREP chip node, but the remote node has not indicated that it recognizes the local node as a BREP chip node. Accordingly, at block 1818 the local node sends an SFZ packet with an ACK, where the packet is a flow control packet, preceded by an SFZ pattern, and with credit_value_sent!='0'. The system then goes to block 1820.

At block 1820 a test is done to determine if three SFZ packets have been sent. In the event that they have not been sent, the system goes to block 1822. In the event that three SFZ packets have been sent, the system goes to block 1816 where the FCTL_On flag is set.

At block 1822 a test is done to determine if a SFZ packet with an ACK was received. In the event that the test answers "yes" that a SFZ packet with an ACK was received, the system goes to block 1816. In the event that the test answers "no" that no such packet was received, the system returns to block 1818. At block 1816 the flag FCTL_On is set, to indicate that flow control with the remote port is possible.

From block 1816 the system goes to block 1830. At block 1830, management code executes the functions of blocks 1832, 1834, 1835. At block 1832 it is determined whether or not the local physical device is a symbol interface. If the local physical device is a symbol interface, the system goes to block 1835 where the management code sets the mode to full duplex. In the event that the local physical device is not a symbol interface, the system goes to block 1834 where the management code initiates the physical device as non-flow control and half duplex.

After exiting block 1835, the system goes to block 1840. At block 1840 the hardware of the BREP chip periodically tests in order to determine if full duplex mode has been set "on". In the event that FDX mode is set, the system goes to block 1842. At block 1842 the register Byte_Count is cleared. The system then goes to block 1844.

At block 1844 the port sends flow control packets to the remote port with the credit value set to actual_value_sent. The system then goes to block 1846

At block 1846 the system tests to determine if a flow control packet has been received. In the event that none have been received, the system returns to block 1844. In the event that a flow control packet has been received, the system goes to block 1848.

At block 1848 the system transmits a flow control packet, FCTL, with the credit set to actual_value_sent. The system then goes to block 1850. At block 1850 the register on_brep_id is cleared. The system then goes to block 1852.

At block 1852 the system establishes a fall duplex connection with flow control.

Figure 19:
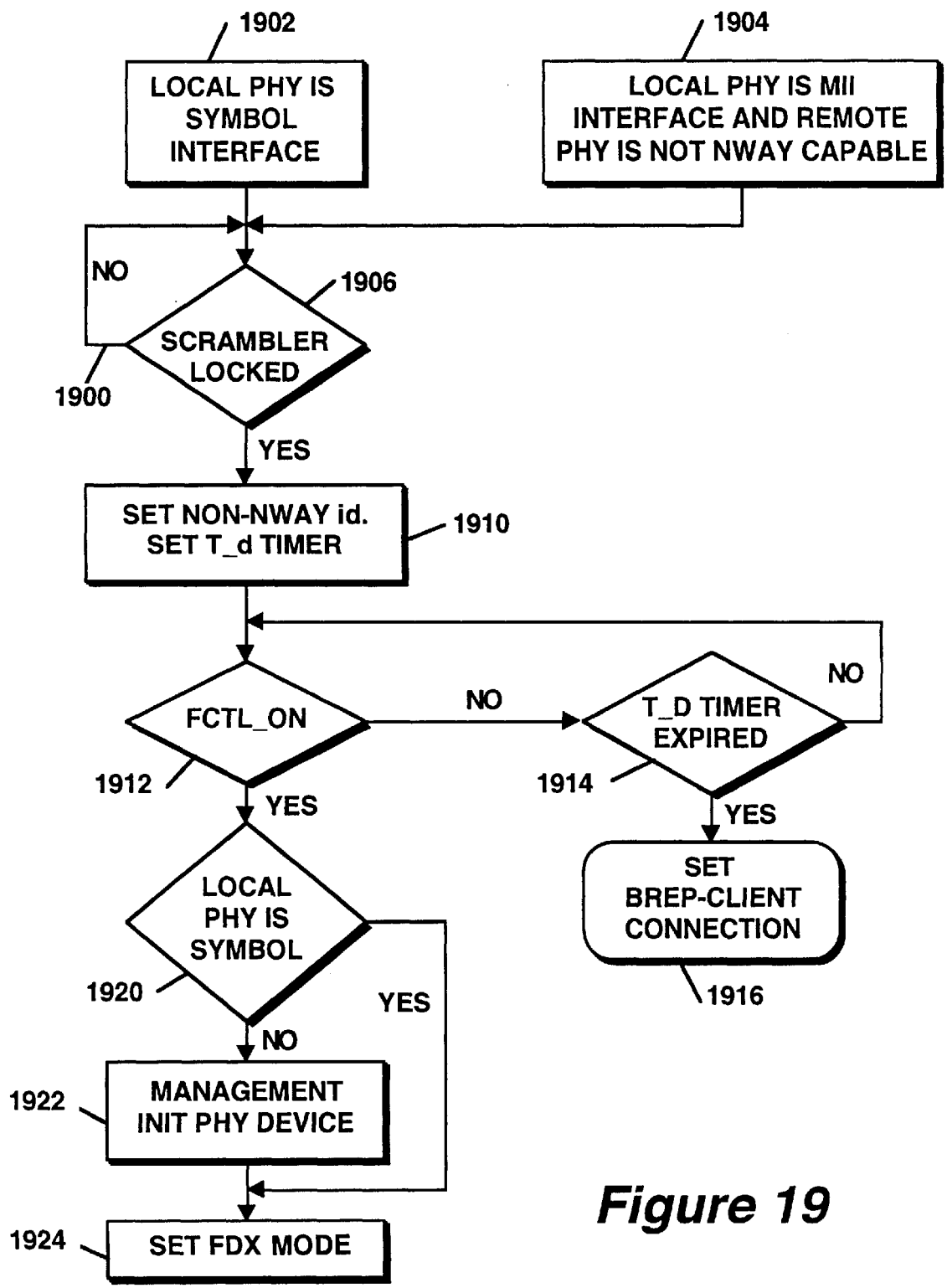
FIG. 19 is the management code flow diagram for establishing full-duplex flow control when the link is not capable of running NWay auto-configuration.

Turning now to FIG. 19, there is shown a flow diagram for management code flow to identify remote node capabilities in case the local physical, PHY, device is a symbol interface PHY, or the remote node is not NWay capable. At block 1902 it is determined that the local physical device is a symbol interface, and at block 1904 it is determined that the local physical device is a NM interface and the remote node port physical device is not NWay capable. From both block 1902 or block 1904 the system goes to block 1906.

At block 1906 a test of whether or not the scrambler is locked is performed, and in the event that it is not, the system returns along path 1908 to repeat the test. In the event that the scrambler is locked, the system goes to block 1910.

At block 1910 the flag non-NWAY is set. Also the timer T_D is set. The system then goes to block 1912.

At block 1912 the flag FCTL_On is tested. In the event that the flag is not set, the system goes to block 1914. At block 1914 the T_D timer expiration is tested. In the event that the timer is expired, the system goes to block 1916. At block 1916 the BREP client connection is set to half duplex without flow control. In the event that the T_D timer has not expired, the system returns to block 1912 to again test the flag FCTL_On. In the event that block 1912 determines that the flag FCTL_On is set, the system goes to block 1920.

At block 1920 the local physical device is tested to determine if it is a symbol interface device. In the event that the local physical device is not a symbol interface device, the system goes to block 1922. At block 1922 the BREP client connection is set to half duplex without flow control. In the event that at block 1920 it is determined that the local physical device is a symbol interface, the system goes to block 1924.

At block 1924 the local port is set to full duplex mode with flow control.

Note, in FIG. 18 and FIG. 19, the abbreviations used include: SFZ packet is a flow control packet, FCTL packet, with credit_value_sent='0', and is preceded by a SFZ pattern; and the a SFZ packet with ACK is a flow control packet, FCTL packet, with credit_value_sent!='0', and also preceded by a SFZ pattern.

Table 10, following, gives the BREP flow control identification process when NWAY detection is supported by both local and remote PHY devices:

TABLE 10

Flow control identification process when NWAY is supported

| Current State | Next State | Condition for Transition | Operation executed while entering the new state |
|---|---|---|---|
| X | 1 | Enable FCTK detection process | Reset Byte_Count<br>Repeat Transmitting FCTL packets with credit_value_sent = 0<br>When working in HDX, transmit according to backoff rules<br>FCTL_On = 1<br>FCTL_id_Fail = 0 |
| 1 | 2 | Receive FCTL packet | Transmit FCTL packet with actual length<br>Resume normal operation using flow control data transfer mechanism<br>FCTL_On = 1<br>FCTL_id_Fail = 0 |
| 1 | 3 | Receive non-FCTL packet | FCTL_id_Fail = 1<br>Do not broadcast received packets<br>Wait for management initiailzation |

After Link_Failed event is detected, the management unit, is responsible to re-initialize the BREP port to create a new link without FCTL. When management unit detects FCTL_id_Fail identification, it should recreate the link without FCTL (BREP-Client mode of operation).

Force FCTL Mode

The BREP chip provides the ability to manual configure the link to either full duplex flow control FDXFCTL, or half duplex flow control HDXFCTL, using the Force_FCTL control bit. When FCTL manual configuration is used, the user must assure that both local and remote node use the same FCTL algorithm, otherwise, the behavior of the BREP port is unpredictable and may lead to system failure.

When the BREP port is initialized to work in Force_FCTL mode, it continuously sends FCTL packets with actual Credit_value_sent value, until it receives the first valid FCTL packet. It then transmits one more FCTL packet with actual Credit_value_sent value and moves to FCTL mode of operation.

Arbitration

Basic arbitration algorithm

The arbitration mechanism is the means for determining which of the ports, in which of the cascaded BREP chips, is granted the next opportunity to broadcast its received packet on a segment bus. A valid arbitration scheme must both avoid deadlocks and allow the system designer to allocate the adequate priority to each of the Fast Ethernet ports connected to the box. There is no on-chip restriction to the arbitration scheme.

The hooks provided to the arbiter logic are the following:

| | |
|---|---|
| ARB-ENA | Output from the arbiter entity. The BREP drives REQ[3:0], TX_FIFO_RDY[3:0] and COL_SEEN[3:0] when ARB_ENA is asserted and tristates them otherwise. |
| TX-FIFO-RDY[i] | Indicates that port[i] is able to load a new packet for transmission (either because its FIFO is empty, or it has passed the collision windows for the currently transmitted packet). Driven only when ARB_ENA is asserted, otherwise it is tristated. |
| REQ[i] | Port[i]'s dedicated request, asserted when it is able to broadcast a received packet. Driven only when ARB_ENA is asserted, otherwise it is tristated. |
| COL_SEEN[i] | When set, indicates that port[i] has experienced a collision during a transmission attempt and the port's REQ line is deasserted. Driven only when ARB-ENA is assessed, otherwise it is tristated. |
| GNT[i] | Port[i]'s dedicated grant, asserted by the arbiter to notify port[i] that it now owns the PDATA[i], CNTL[i] and STRB[i] lines, and may broadcast a received packet. |

The REQ[i], TX_FIFO_RDY[i], and COL-SEEN[i] lines may be multiplexed between several connected BREP devices to lower the number of pins in the arbiter entity. In this case, each BREP's ARB-ENA is used to select one specific BREP's arbitration signals. The GNT[3:0] signals are not multiplexed.

The basic arbitration scheme comprises two rules:

1. If port[i] is the only one in the system asserting REQ[I] while its TX_FIFO_RDY[i] is deasserted, while all other port's TX_FIFO_RDY signals are asserted, the arbiter grants it the broadcasting opportunity by asserting GNT[i]. Port[i] is the only port unable to load a packet, but a port does not need to load a packet broadcasted by itself. Otherwise, 2. If all the system's TX_FIFO_RDYs are asserted, the arbiter grants the next port in turn which has its REQ asserted. In any case, the arbiter should not grant a port unless all other port's TX_FIFO_RDY signals are asserted.

The deassertion of a GNT signal, and the assertion of the next GNT signal, should occur one cycle (80 nsec) after the DATA[i] and CNTL[i] lines return to Idle after a packet broadcast.

In case the CNTL[i] lines remain in Idle state for 5 cycles (400 nsec) or CNTL[i] lines remain in Idle state and REQ line is deasserted, after Arbiter has asserted the port's GNT[i] line, the Arbiter deasserts the port's GNT[i] line and grants the next port in turn which has its REQ asserted.

Although this arbitration mechanism prevents arbitration deadlocks, it does not guarantee absolute fairness between all ports in the system.

Time of Assertion of the TX-FIFO-RDY[i] Signal

A plurality of ports are connected to the arbiter. The arbiter asserts a GNT[i] signal for a port to begin broadcasting a data packet onto a segment bus only after all of the other ports I have asserted TX-FIFO-RDY[i] signal to indicate that they are ready to accept the packet.

The transmit FIFO ready signal, TX-FIFO-RDY[i], is asserted by a port to signal the arbiter that the transmit FIFO is ready to accept the next data packet. The time that the TX-FIFO-RDY[i] signal is asserted is chosen to minimize delay between the broadcast of packets onto the segment bus. For example, a FIFO of a port which is currently transmitting may begin to accept a new packet after the transmission time has passed the collision window. By transmission time is meant the time measured from the start of transmission. And the collision window is the length of time during which a collision may occur, also measured from the start of transmission. The collision window is given by the IEEE 802.3 Standard as a fixed value of 512 bit times. Therefore, for a 10 megabit per second Ethernet the collision window is 51.2 microseconds; and for a 100 megabit per second Ethernet the collision window is 5.12 microseconds. The collision window value is set by the standard on the basis of the topology of the Ethernet collision domains connected to the various ports, the length of the cables connected to the ports, the transmission rate, etc. It is necessary to keep the data in the FIFO intact until the transmission time passes the collision window so that a re-transmission can be done in the event that a collision occurs. After the transmission time passes the collision window, the standard does not require a retransmission in the event that a late collision occurs. Accordingly, the TX-FIFO-RDY[i] signal is asserted as soon as the transmission time passes the collision window.

Figure 20:
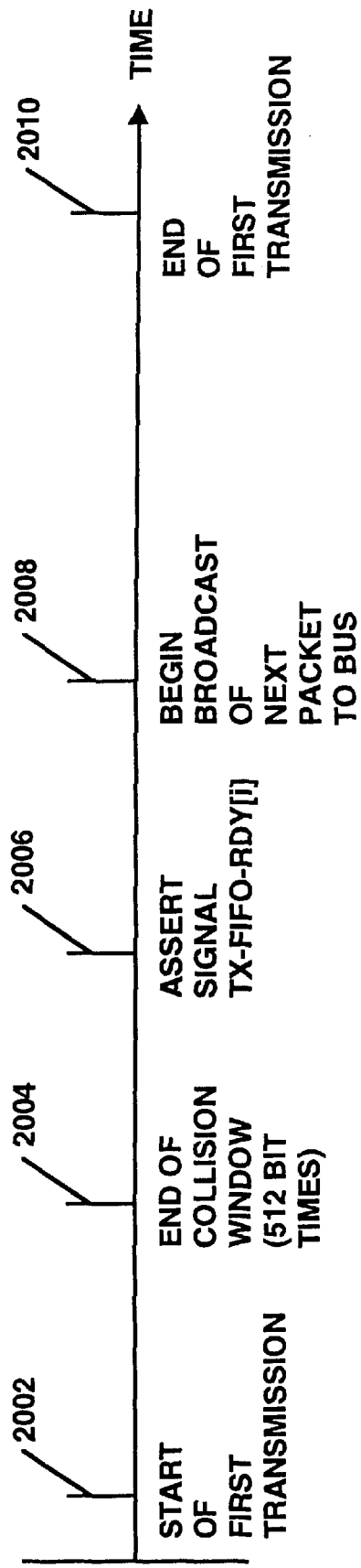
FIG. 20 is a timing diagram for the transmit buffer ready signal.

Turning now to FIG. 20, there is shown a timing diagram of the operation of a typical port. Line 2002 indicates the start of transmission of the typical port. Line 2004 indicates the end of the collision window. Line 2006 indicates the time that the signal TX-FIFO-RDY[i] is asserted by the port. The delay between the end of the collision window and the assertion of the TX-FIFO-RDY[i] signal may be chosen, for example, as a convenient number of clock cycles. A delay of one clock cycle has been found to be satisfactory.

Line 2008 indicates the start of broadcast of the next data packet onto the segment bus by a port, say port j, which has received the next grant signal GNTU[j]. Port j then begins to broadcast the packet in its receive FIFO buffer onto the segment bus. Line 2010 indicates the end of transmission of port I onto its Ethernet collision domain. During the time between the two events indicated by the event of line 2008, the beginning of broadcast of the next packet onto the segment bus by port j, and the event of line 2010, the end of transmission of port I onto its Ethernet collision domain, the transmit FIFO buffer of port I is both emptying by the transmission of its former contents onto the Ethernet collision domain and filling from the next packet being broadcast onto the segment bus by port j. This concurrent filling and emptying of the transmit FIFO buffer is satisfactory because the collision window passes before filling of the transmit FIFO buffer by the new data packet begins, and the currently transmitting data is not needed because the transmit time has passed the collision window. And in the event that a collision occurs after the transmit time passes the collision window, then there is no requirement that the repeater retransmit the data packet.

Arbitration in Segmented Network

Each segmented network should have its own arbitrator. The management unit should notify each arbiter logic about the ports which are grouped in its segment. It should dynamically update the arbiter logic in case a port is added or removed from the segment. The management updates the arbiter logic using a dedicated Control Register which should hold the port numbers that are part of the arbiter network segment.

In case a port is added or removed from a segment, the arbiter should sample or ignore the port's TX_FIFO_RDY and REQ signals, and drive or tristate the port's GNT signal respectively.

The BREP's ARB_ENA signal should be set to "1" whenever its ports are connected to different segments. This setting is required since its arbitration signals (REQ, TX-F'IFO_RDY) can not be multiplexed between several BREP devices while performing segmentation.

Capture effect avoidance

The basic arbitration scheme, however, could lead into a state, where an aggressive or lucky node causes the BREP port connected to it to win many consecutive arbitrations, in the event that its TX_FIFO remains full. Remote nodes connected to the other BREP ports are likely to suffer from collisions, including backoff to higher backoff limit values, and therefore further reduce their chances to successfully transmit at their next attempt. This state is an extension of the symptom known as capture effect in Ethernet networks, and this state may lead to some network performance degradation.

One way to avoid such a scenario is to have the arbiter entity maintain a "consecutive GNTs counter". The arbiter increments this counter at each consecutive GNT assertion for the same BREP port, and resets it whenever another port's GNT is asserted.

Whenever a consecutive_GNT_cntr[i] reaches a predefined threshold and another port's COL_SEEN[i], or REQ[i] signal assertion is detected, the arbiter stops asserting GNT[i] for a period of N (programmable value) slot times. At the end of this period, the arbiter resets the consecutive_GNT_cntr and resumes normal operation.

If consecutive_GNT_cntr[i] reaches its predefined threshold and no other port's COL_SEEN[i] signal assertion is detected, the Arbiter continues to GNT the requested port until either another port's COL_SEEN[i] signal is asserted, or the granted port deasserts its REQ signal.

This mechanism increases the chance that stations connected to other BREP ports are able to transmit their packets even when an aggressive or lucky node exists in the system.

Network Interface

Each BREP's port implements the MII/SYM port signals to support the following operating modes:

10 Mbps or 100 Mbps MII interface mode. In this mode the BREP port can be used with any MII PHY device that implements the 10 BaseT, or 100 BaseT PHY. In order to benefit from BREP port unique features and improve the overall system performance, the MII PHY device should implement the following features: NWAY physical layer link signaling auto-negotiation; Support for full duplex connection for Category 5 UTP, or STP PHY devices.

100 BaseTX symbol interface mode. Each BREP port implements certain functions of the PCS for UTP CAT5 PMD. The reserve symbols are 5 bits wide and are transferred over the mii_cs_rxd<3:0>/sym_rxd<3:0> and mii-clsn/sym_rxd<4> lines. The transmit symbols are also 5 bits wide and are transferred over the mii_cs_txd<3:0>/sym-txd<3:0>and mii_txen/sym_txd<4> lines. The functions included are the following.:

4/5-bit encoding and decoding;
Start of stream delimiter (SSD) and end-of-stream delimiter (ESD) detection and generation;
Bit alignment;
Carrier detect;
Collision detect;
Symbol error detection;
False carrier detection;
Scrambling and de-scrambling; and,
Link timer.

Connecting mixed data rate ports to the same segment may lead to improper BREP port behavior and therefore to data corruption.

Hardware and Software Reset

The BREP responds to two types of reset commands

A reset through the RST pin

A port software reset command triggered by setting the SWR<#> register.

The RST pin should be connected to all the system devices (Includes the PHY devices). When RST reset is performed, all ongoing transmission and reception processes in all ports are aborted. All the BREP's registers and state machines are reset to their default value and should be re-initialized by the management code. The port's receive and transmit processes are placed in the STOPPED state. Successive reset commands (hardware, or software) may be issued. The Reset sequence is completed, for example, only 16 cycles after the deassertion of the RST pin.

Software reset enables the user to perform selective port reset. The Software reset command takes place only if the port's parallel interface is either: in Idle, or Loading a packet from the parallel interface. If the port is broadcasting data and the management unit issues a software reset, the reset operation is delayed until the parallel interface is in Idle state.

When the software reset is performed the port's transmission and reception processes are aborted. The port's registers and state machines are reset to their default values and the receive and transmit processes are placed in the STOPPED state. Note: When a port is reset (either SW, or HW), the port's PHY device should be reset as well, in order to create Link_Failed detection at the port's remote node.

What is claimed is:

1. A repeater comprising:

a plurality of ports;

a separate receive buffer for each port of said plurality of ports, said receive buffer to hold a packet received from an Ethernet collision domain connected to said port;

a separate transmit buffer for each port of said plurality of ports, said transmit buffer to hold a packet to be transmitted onto said Ethernet collision domain connected to said port;

a bus within said repeater for communication between said plurality of ports, the receive buffer of a port broadcasting a packet onto said bus for loading at transmit buffers of other ports;

an arbiter to control access to said bus by a port, said arbiter granting access to said bus by a requesting port, said requesting port having a received packet in a receive buffer of said requesting port, said arbiter granting said access to said bus upon assertion of a "transmit buffer ready" signal from each port of said plurality of ports other than said requesting port;

means for a transmitting port of said plurality of ports to assert a "transmit buffer ready" signal to said arbiter at the transmit time after passage of a collision window as said transmitting port empties its transmit buffer by transmitting a stored packet onto an Ethernet collision domain connected to the said transmitting port, and at a transmit time before the transmit buffer is emptied.

2. The repeater as in claim 1 further comprising:

means for said transmitting port transmit buffer to begin loading a new packet from a receive buffer of said requesting port by said requesting port being granted access to said bus by said arbiter, and said requesting port broadcasting said new packet from its receive buffer onto said bus, said transmitting port transmit buffer loading said new packet before said transmitting port transmit buffer is emptied by transmission of said stored packet onto said Ethernet collision domain connected to said transmitting port.

3. A method of operating a repeater having a plurality of ports, comprising the steps of:

holding a packet, said packet received from an Ethernet collision domain connected to a port, in a receive buffer of said port, where each port of said plurality of ports has a separate receive buffer;

holding a packet, said packet to be transmitted onto said Ethernet collision domain connected to said port, in a transmit buffer of said port, where each port of said plurality of ports has a separate transmit buffer;

broadcasting a packet onto a bus, for receipt by transmit buffer is of other ports, by a receive buffer of a port;

controlling access to said bus by an arbiter, said arbiter granting access to said bus by a requesting port, said requesting port having a received packet in a receive buffer of said requesting port, said arbiter granting said access to said bus upon the assertion of a "transmit buffer ready" signal from each port of said plurality of ports other than said requesting port;

asserting, by a transmitting port of said plurality of ports, a "transmit buffer ready" signal to said arbiter at a transmit time after passage of a collision window as said transmitting port empties its transmit buffer by transmitting a stored packet onto an Ethernet collision domain connected to said transmitting port, and at a transmit time before the transmit buffer is empty.

4. The method of claim 3 further comprising:

loading a new packet, from a receive buffer of said requesting port by said requesting port being granted access to said bus by said arbiter and said requesting port broadcasting said new packet from its receive buffer onto said bus, by said transmitting port transmit buffer, said transmitting port transmit buffer loading said new packet before said transmitting port transmit buffer is emptied by transmission of said stored packet onto said Ethernet collision domain connected to said transmitting port.

5. An apparatus for communicating between a plurality of different networks, the apparatus comprising:

a plurality of ports corresponding to the plurality of different networks;

a plurality of receive buffers, each one of the plurality of receive buffers associated with one of the plurality of ports;

a plurality of transmit buffers, each one of the plurality of transmit buffers associated with one of the plurality of ports;

a plurality of fullness signals, each one of the plurality of fullness signals associated with a corresponding one of the plurality of transmit buffers, each one of the plurality of fullness signals for indicating a relative fullness of the associated one of the plurality of transmit buffers;

a bus, coupled to the plurality of transmit buffers and the plurality of receive buffers, to transfer data between the buffers; and an arbiter, coupled to the bus, for controlling access to the bus by each of the plurality of ports responsive to the plurality of fullness signals.

6. The apparatus according to claim 5, wherein each one of the plurality of fullness signals is set to indicate that the port associated with the corresponding transmit buffer has completed a predetermined stage of transmission of data to a coupled one of the plurality of networks.

* * * * *